United States Patent
Philion et al.

(10) Patent No.: US 12,214,809 B2
(45) Date of Patent: *Feb. 4, 2025

(54) INSTANCE SEGMENTATION IMAGING SYSTEM

(71) Applicant: iSee, Inc., Cambridge, MA (US)

(72) Inventors: Jonah Philion, Toronto (CA); Yibiao Zhao, Cambridge, MA (US)

(73) Assignee: iSee, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/341,039

(22) Filed: Jun. 26, 2023

(65) Prior Publication Data
US 2023/0358533 A1 Nov. 9, 2023

Related U.S. Application Data

(63) Continuation of application No. 16/847,253, filed on Apr. 13, 2020, now Pat. No. 11,718,324.
(Continued)

(51) Int. Cl.
*G06T 7/73* (2017.01)
*B60R 11/04* (2006.01)
(Continued)

(52) U.S. Cl.
CPC ....... *B60W 60/00274* (2020.02); *B60R 11/04* (2013.01); *B60S 5/00* (2013.01); *B60W 60/0011* (2020.02); *B60W 60/0018* (2020.02); *G01B 11/275* (2013.01); *G01B 11/2755* (2013.01); *G05D 1/0088* (2013.01); *G05D 1/0238* (2013.01); *G06F 18/214* (2023.01); *G06F 18/2413* (2023.01); *G06T 7/0004* (2013.01); *G06T 7/60* (2013.01); *G06T 7/73* (2017.01); *G06V 10/764* (2022.01); *G06V 10/82* (2022.01);
(Continued)

(58) Field of Classification Search
CPC . G06F 18/214; G06F 18/2413; G06T 7/0004; G06T 7/60; G06T 7/73
USPC .......................................................... 382/195
See application file for complete search history.

(56) References Cited

U.S. PATENT DOCUMENTS 10,373,003 B2 8/2019 Liu et al.
10,482,769 B2 11/2019 Liu et al.
(Continued)

FOREIGN PATENT DOCUMENTS

WO 2014128051 A1 2/2014
WO 2018204656 A1 8/2018
(Continued)

*Primary Examiner* — Ayodeji O Ayotunde
(74) *Attorney, Agent, or Firm* — Danielson Legal LLC

(57) ABSTRACT

A method of instance segmentation in an image and a system for instance segmentation of images. The method includes identifying, with a processor, a starting pixel associated with an object in an image, the image having a plurality of rows of pixels, the starting pixel located in a row of the plurality of rows; identifying, with the processor, at least one pixel located in an adjacent row to the row in which the starting pixel is located, the at least one pixel being part of the same object as the starting pixel; iterating the previous two identification steps using the at least one identified adjacent row pixel as a start pixel for the next iteration; and connecting, with the processor, the at least one identified adjacent row pixels to form polylines representing the object.

20 Claims, 14 Drawing Sheets

Related U.S. Application Data

(60) Provisional application No. 62/832,805, filed on Apr. 11, 2019.

(51) Int. Cl.
  *B60S 5/00* (2006.01)
  *B60W 60/00* (2020.01)
  *G01B 11/275* (2006.01)
  *G05D 1/00* (2006.01)
  *G06F 18/214* (2023.01)
  *G06F 18/2413* (2023.01)
  *G06T 7/00* (2017.01)
  *G06T 7/60* (2017.01)
  *G06V 10/764* (2022.01)
  *G06V 10/82* (2022.01)
  *G06V 20/00* (2022.01)
  *G06V 20/56* (2022.01)
  *H04N 7/18* (2006.01)
  *H04N 23/90* (2023.01)
  *B62D 17/00* (2006.01)
  *G01M 17/013* (2006.01)
  *G08B 5/22* (2006.01)

(52) U.S. Cl.
  CPC ............ *G06V 20/00* (2022.01); *G06V 20/588* (2022.01); *H04N 7/181* (2013.01); *H04N 23/90* (2023.01); *B60W 2400/00* (2013.01); *B60W 2420/403* (2013.01); *B62D 17/00* (2013.01); *G01B 2210/12* (2013.01); *G01B 2210/14* (2013.01); *G01B 2210/26* (2013.01); *G01B 2210/30* (2013.01); *G01M 17/013* (2013.01); *G06T 2207/10016* (2013.01); *G06T 2207/30164* (2013.01); *G08B 5/22* (2013.01)

(56) References Cited

U.S. PATENT DOCUMENTS

| | | | |
|---|---|---|---|
| 10,528,851 B2 | 1/2020 | Zhu et al. | |
| 11,718,324 B2 * | 8/2023 | Philion | B60W 60/0018 382/104 |
| 2018/0188059 A1 | 7/2018 | Wheeler et al. | |
| 2019/0063945 A1 | 2/2019 | Liu et al. | |
| 2019/0065866 A1 | 2/2019 | Liu et al. | |
| 2019/0066512 A1 | 2/2019 | Liu et al. | |
| 2019/0102631 A1 | 4/2019 | Li et al. | |
| 2019/0102674 A1 | 4/2019 | Kwant et al. | |
| 2019/0147253 A1 | 5/2019 | Bai et al. | |
| 2019/0171223 A1 | 6/2019 | Liang et al. | |
| 2019/0266418 A1 | 8/2019 | Xu et al. | |
| 2019/0384303 A1 | 12/2019 | Muller et al. | |
| 2019/0384304 A1 | 12/2019 | Towal et al. | |
| 2020/0026960 A1 | 1/2020 | Park et al. | |

FOREIGN PATENT DOCUMENTS

| | | |
|---|---|---|
| WO | 2019040670 A1 | 8/2018 |
| WO | 2019099622 A1 | 5/2019 |
| WO | 2019241022 A1 | 6/2019 |
| WO | 2020018679 A1 | 7/2019 |
| WO | 2019168869 A1 | 9/2019 |
| WO | 2019220235 A1 | 11/2019 |
| WO | 2019238560 A1 | 12/2019 |

* cited by examiner

INSTANCE SEGMENTATION IMAGING SYSTEM

CROSS REFERENCE TO RELATED APPLICATIONS

The present application claims the benefit of and priority to U.S. patent application Ser. No. 16/847,253, filed on Apr. 13, 2020, since issued as U.S. Pat. No. 11,718,324 on Aug. 8, 2023, which itself claims priority to U.S. provisional application No. 62/832,805, filed on Apr. 11, 2019, the entire disclosure of each of which are hereby incorporated by reference as if set forth in its entirety herein.

TECHNICAL FIELD

The present invention generally relates to instance segmentation of an image, and more specifically, to systems and methods using iterative processing to identify pixels in an image to form polylines.

BACKGROUND

Traditional methods for identifying pixels in an image, specifically those modeling lane detection, rely on a three-step template. First, a trained classifier within a system estimates the likelihood that each pixel in an image is part of a lane. Then, the system collects pixels that exceed a certain threshold probability of being part of a lane. Finally, the system clusters the thresholded pixels into individual lanes. For example, a system may use random sample consensus (RANSAC) to fit a parametric lane curve to a set of pixels. Random sample consensus is described in M. A. Fischler, R. C. Bolles, "Random Sample Consensus: A Paradigm for Model Fitting with Applications to Image Analysis and Automated Cartography," Comm. of the ACM, Vol. 24, pp. 381-395, 1981, which is hereby incorporated by reference as if set forth in its entirety herein.

In the three-step template, the inference of lane structure in the latter two steps is not part of the learning objective used to train the classifier in the first step. This hurts system performance. Furthermore, the clustering process in the third step may be resource intensive. In some embodiments, the frame rate at which the system can execute the approach may be limited by processor capacity or rate. Moreover, some models are only configured to use pre-labeled training data and cannot translate information from labeled data in one environment to unlabeled data in another environment.

Accordingly, there is a need for improved methods and systems to identify objects in an image.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

According to one aspect, embodiments relate to a method of instance segmentation in an image. In some embodiments, the method includes (a) identifying, with a processor, a starting pixel associated with an object in an image, the image having a plurality of rows of pixels, the starting pixel located in a row of the plurality of rows; (b) identifying, with the processor, at least one pixel located in an adjacent row to the row in which the starting pixel is located, the at least one pixel being part of the object; (c) iterating steps (a)-(b) using the at least one identified adjacent row pixel as a start pixel for a next iteration of steps (a)-(b); and (d) forming, with the processor, a line through the at least one identified adjacent row pixel to represent the object.

In some embodiments, the method further includes forming a line segment between each identified adjacent row pixel. In some embodiments, the method further includes forming a line by fitting a curve through the identified adjacent row pixels in the image. The curve may be fitted through the identified adjacent row pixels instead of drawing line segments from each pixel in an image. In some embodiments, the object is a lane object and the image is an image of a road surface. In some embodiments, identifying the at least one adjacent row pixel comprises: (b-1) assigning, with the processor, a probability value to each pixel in a plurality of pixels in a window in a row adjacent to the row of pixels in which the start pixel is located, wherein the probability value is the likelihood that each pixel in the plurality of pixels is part of the same object as the start pixel; and (b-2) identifying, with the processor, the at least one adjacent row pixel as being in the same object as the start pixel when the assigned probability value of the at least one adjacent row pixel exceeds a threshold. In some embodiments, identifying the at least one adjacent row pixel comprises: (b-1) assigning, with the processor, a probability value to each pixel in a plurality of pixels in a window in a row adjacent to the start pixel, wherein the probability value is the likelihood that each pixel in the plurality of pixels is part of the same object as the start pixel; and (b-2) identifying, with the processor, the at least one adjacent row pixel with the highest probability of being part of the object as being in the same lane as the start pixel. In some embodiments, identifying the start pixel for the image of a road surface comprises: estimating, for each pixel in the image, a probability that each pixel is part of the lane object; masking the image pixels to retain pixels located in a border around the edges of the image and discarding pixels in a middle portion of the image; thresholding the probabilities of each pixel in the image to classify each pixel in the image into whether or not each pixel in the image is part of the lane object; and spatially clustering the pixels into a finite set of initial object pixels from which the initial starting pixel can be selected. In some embodiments, identifying the at least one adjacent row pixel comprises identifying the at least one adjacent row pixel using a trained classifier. In some embodiments, (d) is performed after the processor identifies an endpoint of the object in a row adjacent to the previous iteration start pixel. In some embodiments, training for the trained classifier comprises perturbing the identified starting pixel as part of the training.

In another aspect, embodiments relate to a system for instance segmentation of an image. In embodiments, the system includes a processor configured to: (a) identify a starting pixel in an image associated with a lane object in the image; the image having a plurality of rows of pixels, the starting pixel located in a first row of the plurality of rows; (b) identify at least one adjacent row pixel in the lane object; (c) iterate steps (a)-(b) using the at least one identified adjacent row pixel as a start pixel for a next iteration of steps (a)-(b); and (d) form a line through the at least one identified adjacent row pixel to represent the lane object.

In some embodiments, the processor is configured to identify the at least one adjacent row pixel by: assigning, with the processor, a probability value to each pixel in a plurality of pixels in a window in a second row adjacent to the first row, wherein the probability value is the likelihood that each pixel in the plurality of pixels is part of the lane object; and identifying, with the processor, the at least one adjacent row pixel as being in the same lane object as the start pixel when the assigned probability value of the at least one adjacent row pixel exceeds a threshold. In some embodiments, the system is configured to assign a probability of being part of the lane object to each pixel in a row adjacent to the first row; and the adjacent row pixel has the highest probability of being part of the lane object. In some embodiments, identifying the at least one adjacent row pixel comprises identifying the at least one adjacent row pixel using a trained classifier. In some embodiments, the processor is configured to connect the at least one identified adjacent row pixel to the start pixel to form a lane object representing the lane after identifying an endpoint in a row adjacent to the start pixel. In some embodiments, the image is received from at least one of a camera attached to a moving vehicle, a camera providing an aerial view of a roadway, a satellite imager, and a source of two-dimensional map data. In some embodiments, the classifier is trained with a set of training images; a first subset of the set of training images used to train the classifier are annotated; a second subset of the training images are synthetic; the synthetic images are generated by extracting content including annotations and style information from the first subset of images, discarding the extracted style information and replacing the extracted style information with new style information; and the new style information is extracted from a dataset of camera images, wherein the annotations from the first subset of images are preserved in the synthesized images.

In another aspect, embodiments relate to an autonomous driving system for a vehicle. In some embodiments, the system includes a motion planning subsystem; a lane object detection system; and an uncertainty measure for lane objects identified by the lane object detection system, wherein the motion planning subsystem alters parameters associated with safe operation of the autonomous vehicle as a function of the uncertainty measure of the detected lane objects.

In some embodiments, the autonomous driving system further includes a subsystem for sensing the presence of objects surrounding the vehicle, wherein the motion planning subsystem increases a first weight applied to a first output of the subsystem for detecting surrounding objects relative to a second weight applied to a second output of the lane object detection system in order to plan a lateral position of the vehicle, when an uncertainty of a lane object detected by the lane object detection system is above a threshold. In some embodiments, the motion planning subsystem increases follow distance, decreases speed, or inhibits lane changes of the vehicle, singly or in any combination, when an uncertainty for a lane object detected by the lane object detection system is above a threshold.

In yet another aspect, embodiments relate to a method for unsupervised generation of annotated image training datasets. In some embodiments, the method includes extracting content data comprising annotations and style data from a first annotated dataset; preserving the content data and annotations and discarding the style data; extracting new style data from second non-annotated image dataset; and synthesizing a third dataset by combining the content data, the annotations from the first dataset, and the style data extracted from the second dataset.

These and other features and advantages, which characterize the present non-limiting embodiments, will be apparent from a reading of the following detailed description and a review of the associated drawings. It is to be understood that both the foregoing general description and the following detailed description are explanatory only and are not restrictive of the non-limiting embodiments as claimed.

BRIEF DESCRIPTION OF DRAWINGS

Non-limiting and non-exhaustive embodiments are described with reference to the following figures in which.

In the drawings, like reference characters generally refer to corresponding parts throughout the different views. The drawings are not necessarily to scale, emphasis instead being placed on the principles and concepts of operation.

DETAILED DESCRIPTION

Figure 1:
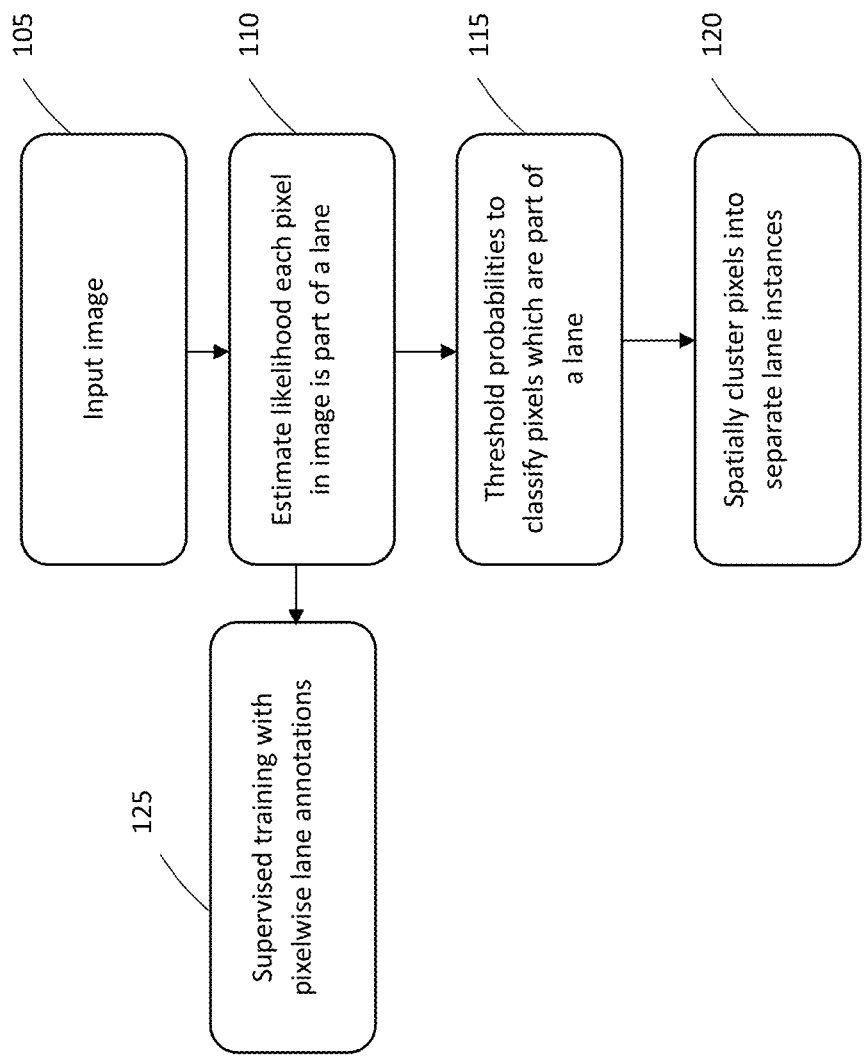
FIG. 1 is a block diagram of prior art lane detection approaches.

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Reference in the specification to a "time" should be understood to refer to a value similar to a UNIX® time value, i.e., a numerical value (such as an integer) that may be understood as referring to a particular time occurring on a particular day. The numerical value is typically incremented in an ascending order, such that a larger value relates to a later time than a smaller value.

Some portions of the description that follow are presented in terms of symbolic representations of operations on non-transient signals stored within a computer memory. These descriptions and representations are the means used by those skilled in the data processing arts to convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions that could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may employ multiple processor designs for increased computing capability.

In addition, the present invention is not described with reference to any particular programming language. It will be appreciated that a variety of programming languages may be used to implement the teachings of the present invention as described herein, and any references below to specific languages are provided for disclosure of enablement and best mode of the present invention. The embodiments of the systems, methods, and apparatuses described herein may be implemented in a number of different types of computing environments. These computing environments may include, but are not limited to, single-file systems, distributed file systems, software-defined storage environments, or the like. In some embodiments, the systems, methods, and apparatuses described herein may be implemented as a software-defined logic file storage layer.

In addition, the language used in the specification has been principally selected for readability and instructional purposes and may not have been selected to delineate or circumscribe the inventive subject matter. Accordingly, the disclosure of the present invention is intended to be illustrative, but not limiting, of the scope of the invention, which is set forth in the claims.

Some embodiments described herein are directed to a fully convolutional model of object detection. Methods may be used to facilitate end-to-end learning of lane structure detection for autonomous vehicles. Methods may be implemented in autonomous vehicle navigation and navigational warning systems. In some embodiments, the model may learn to decode objects such as lane structures instead of delegating structure inference to post-processing. The convolutional decoder may be configured to represent an arbitrary number of lanes per image, preserve the polyline representation of lanes without reducing lanes to polynomials, and draw lanes iteratively without requiring the computational and temporal complexity of recurrent neural networks. The model may include an estimate of the joint distribution of neighboring pixels belonging to the same lane and a natural and computationally inexpensive definition of uncertainty. In some embodiments, the network may be autoregressive and may include a default definition of uncertainty. The model may be adaptable to new environments using unsupervised style transfer.

A polyline may refer to a series of line segments drawn with algorithmic assistance. In some embodiments, a processor may draw a polyline by drawing a first line segment from a starting pixel to an adjacent row pixel (second pixel) and then drawing a second line segment from the second pixel to a pixel adjacent to the second pixel (third pixel). The processor may qualify each pixel as a pixel in the polyline by evaluating certain qualities of the pixel. For example, the processor may evaluate the color and location of the pixel in the image to determine the likelihood that the pixel is part of an object, such as a roadway lane, roadside feature, lamppost, or road obstacle. The processor may assign an uncertainty value to the pixel and, if the uncertainty value is lower than a predetermined threshold, the pixel may qualify. The processor may continue this evaluation and line segmentation process until the processor stops identifying qualifying adjacent row pixels. The result may be considered a polyline.

Embodiments described herein may be able to draw polylines representing any number of lane objects of any length within a captured image. Lane objects may be lane markings, lane boundaries or any other physical construct representing a lane or portion thereof. Embodiments may detect objects such as roadway lanes in real time and quickly identify an object after initial image capture. Some embodiments may use local recursion over a portion of an image to draw polylines faster than a commercially available processor analyzing every pixel in an image.

Embodiments may be trained to improve drawing of polylines in images from domains which differ from the domains in an initial set of annotated images. For example, embodiments may improve their ability to detect lanes on icy or snow-covered roads by training on additional images synthesized from available annotated images of clear roads and extracted style information from un-annotated images of the icy or snow-covered roads. Similarly, embodiments may exhibit improved detection of roadway lanes from nighttime images after training on a dataset of images synthesized from annotated daytime roadway lane images and non-annotated nighttime roadway images.

In some embodiments, the system may define lanes under the assumption that lanes are curve segments that are functions of the height axis of an image. In some embodiments, the system may assume that a lane can be drawn iteratively by conditioning exclusively on the previous pixel that was determined to be part of the lane.

As previously discussed and as shown in FIG. 1, commercially available lane detection systems may capture an image and supply the captured image to a processor 105. Then, the processor may analyze each pixel in the image and estimate the likelihood that each pixel in the image is part of a lane 110. The processor may engage in supervised training 125 to increase the accuracy of the likelihood estimate 110. The supervised training may include images that incorporate pixelwise lane annotations.

The commercially available lane detection system then classifies the pixels that match or exceed a threshold probability estimate 115. For example, each pixel that is classified as 95% likely to be part of a lane or higher would exceed a set threshold probability estimate 115 of 95% certainty. Lane detection systems may then spatially cluster the pixels exceeding the probability estimate into separate lane instances 120. From these spatial clusters, the lane detection system may determine the boundaries of a lane.

Figure 2:
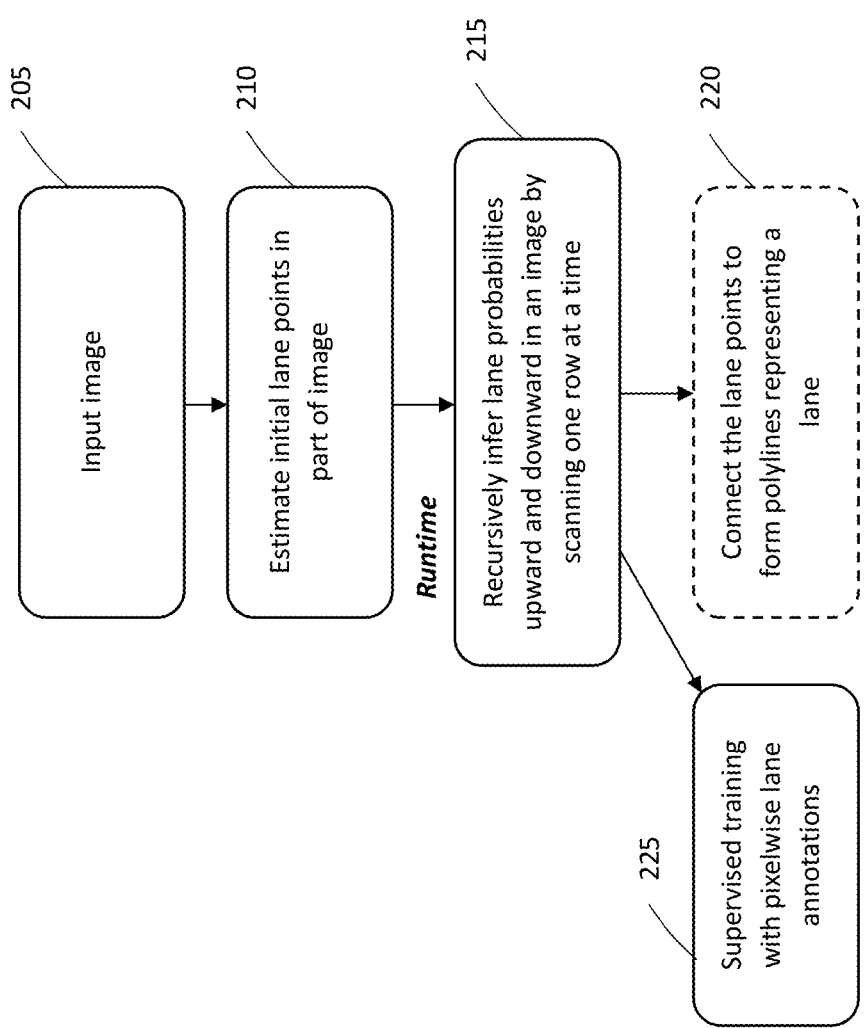
FIG. 2 is a block diagram of a lane detection approach in accordance with one embodiment.

FIG. 2 shows a block diagram of an improved lane detection approach in accordance with one embodiment. In some embodiments, a system may capture and input an image into a processor (step 205). The processor may analyze part of the image to estimate one or more initial lane points in the image (step 210). For example, the processor may apply a mask to the input image, as detailed in FIG. 8. The processor may then estimate initial lane points within the masked region, with one starting pixel for each lane object (step 210). In one non-limiting example, the processor may recognize that an image was taken at ground level and, therefore, the lower half of the image would be more likely to have pixels corresponding to a lane than the top half of the image.

Having identified a starting pixel corresponding to an object, such as a lane object, within the unmasked portion of the image, the processor may then scan rows of pixels above and below the starting pixel in some embodiments. The processor may then recursively infer lane probabilities in the scanned pixel rows adjacent to the starting pixel that pixels are part of the lane object (step 215). In some embodiments, the processor may recursively infer lane probabilities upward and downward in an image by scanning one row at a time (step 215). In some embodiments, the system may predict the local lane shape at each pixel based on the pixels in the adjacent rows.

In some embodiments, the processor may connect the identified adjacent row pixels to form polylines (step 220). In some embodiments, these polylines may represent an object, such as a roadway lane. In some embodiments, the processor may maximize the probabilities of polylines.

In some embodiments, the iterative steps 205-220 may be run in real time and may be used by autonomous vehicle systems.

In some embodiments, the processor may be configured to detect an object to facilitate autonomous operation of a vehicle by detecting roadway lane objects and other objects in the roadway. Information or data representative of objects detected by object detectors disclosed herein may be output to a motion planning subsystem of an autonomous vehicle, where the information is used by the motion planning subsystem for use in determining autonomous vehicle motion. The motion planning subsystem may cause the lateral positioning of the vehicle within a lane or roadway to be altered based on the information. The motion planning subsystem may use the information to keep the autonomous vehicle within a lane, to actuate a lane change operation or to maneuver to avoid a detected object. The processor may additionally use a map and/or speed limit data in some embodiments. The iterated detection algorithm of FIG. 2 may allow real-time object detection to be used in combination with a map in some embodiments.

In some embodiments, the system may use the iterative detection method of FIG. 2 to assist a driver of a non-autonomous vehicle. For example, the system may receive an image from a camera in a car (step 205) and estimate initial lane points in the image (step 210). The system may recursively infer lane probabilities (step 215) and connect lane points to form polylines (step 220) representing a lane. The system may compare the polylines to the location of the vehicle and may notify the driver if the vehicle exceeds the bounds of the polyline lanes. The system may notify the driver if the lanes cannot be detected beyond a threshold uncertainty value in some embodiments.

In some embodiments, the system may analyze at least 45 images per second. In some embodiments, the system may analyze at least 60 images per second. In some embodiments, the system may analyze at least 75 images per second. In some embodiments, the system may analyze at least 90 images per second.

In some embodiments, the iterative detection method of FIG. 2 may be used as an iterative annotation tool to decrease the cost of building maps, including high definition maps. In some embodiments, the algorithm may be used to generate annotations for a raw data set without requiring human intervention.

Figure 3:
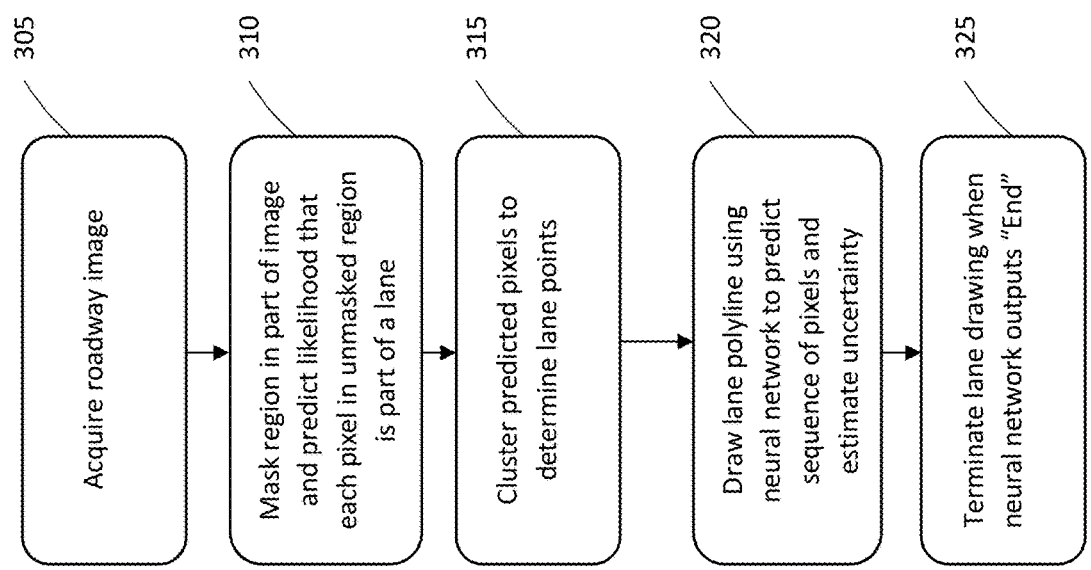
FIG. 3 is a block diagram of steps for identifying a lane in an image in accordance with one embodiment.

FIG. 3 is a block diagram of steps for identifying a lane in an image in accordance with one embodiment. In some embodiments, a system acquires an image (step 305). The system may acquire the image through a camera, video, or other recording device. In some embodiments, the system may acquire an image of a plurality of lanes (step 305).

In some embodiments, the system in steps 310 and 315 may select a set of starting pixels that are most likely to be part of each lane object. In step 310, the system may mask a region of the image and a trained neural network classifier may calculate a probability that a pixel is part of a lane object for each pixel in the unmasked area. In some embodiments, the system identifies an optimum region, or window, in the image to mask. For example, if the camera acquiring the image is at ground level, the system may mask a window in the upper half of the image to identify at least one roadway lane. In some embodiments, if the image includes a plurality of lanes, the system may mask a window in the upper half of the image to identify at least one pixel for each roadway lane in the image. If the camera acquiring the image is an aerial camera, the system may mask a different region of the image more likely to include a line designating a roadway lane. In some embodiments used with satellite imagery, starting pixels for lane objects may be selected manually or automatically. Since an individual satellite image may typically cover a substantial area, the operation of selecting a set of initial starting pixels does not need to be performed very often making manual selection feasible.

Figure 9:
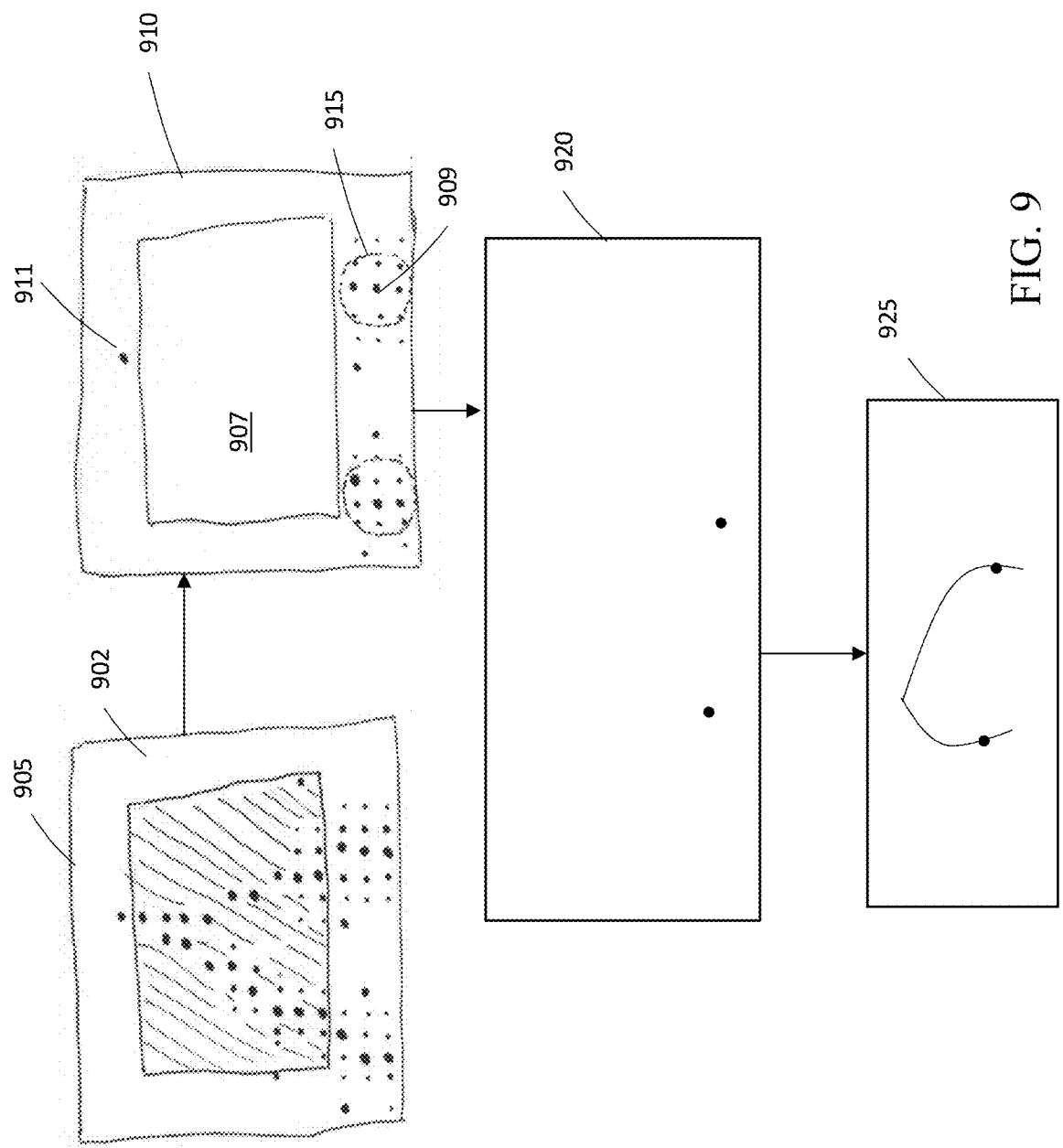
FIG. 9 depicts a method of masking image and analyzing the region of interest in accordance with one embodiment.

In step 315, the system may perform clustering for pixels with probabilities calculated in step 310 that exceed a predetermined threshold, and the system may select a starting pixel for each lane, as detailed in FIG. 9. In some embodiments, system may apply the density-based spatial clustering of applications with noise algorithm (DBSCAN) as the data clustering algorithm (step 315). The system may cluster pixels with a high likelihood of being part of a lane and then further analyze each pixel in that cluster to determine the most likely initial lane pixel for each lane in the image. The system may categorize a "high likelihood" as meeting a predetermined probability threshold that the pixel is part of a lane or other object. In some embodiments, the system may categorize a "high likelihood" as more likely than a certain number of pixels in the image as being part of a lane or object. In some embodiments, the system may identify the pixel with the highest likelihood of all the pixels or remaining pixels in the image as being part of a lane or object.

The system may set a parameter specifying the radius of a neighborhood cluster with respect to an initial pixel. In some embodiments, the radius of the neighborhood cluster is five pixels. In some embodiments, the radius is fewer than ten pixels. In some embodiments, the radius is greater than three pixels.

In some embodiments, the processor looks at a row of pixels in the complete image that is adjacent to the row of pixels in which the starting pixel was identified. In some embodiments, the neural network classifier may look at a subset of pixels in the adjacent row and identify the probability that each subset pixel is part of the same lane object as the starting pixel (step 320). The processor may select a pixel in the adjacent row as a next pixel based on the calculated probabilities. In some embodiments, the next pixel selected may be the pixel within the subset of pixels in the adjacent row of pixels with the highest probability of being part of the lane object. In one non-limiting example, a next pixel may be selected from a group of pixels within the subset of pixels that has a probability that the pixel is part of the lane object that exceeds a predetermined threshold. In some embodiments, the system may draw a line from a starting pixel to an identified pixel in an adjacent row that has a high likelihood of being part of the same object as the starting pixel (step 320). The system my draw lines extending in an upward or downward direction to connect two pixels in adjacent rows of the image.

In some embodiments, the neural network may estimate an uncertainty value that the secondary pixel is part of at least one lane associated with the first identified pixel of that lane (step 320). In some embodiments, the neural network may predict a sequence of pixels for each lane in the image (step 320). The uncertainty measure may be based on the distributions of calculated probabilities, as further detailed below.

The system in step 325 may terminate lane drawing in the current direction when the neural network outputs an "end token" or "End". The neural network can be trained to recognize the end of a lane object and output an end token when the end of a lane object is recognized.

In some embodiments, the ability of the processor to identify adjacent pixels associated with a lane or other object of interest may be facilitated or improved using a supervised training process with a dataset having pixelwise lane annotations 225. The training may help to improve the accuracy of pixel identification in the image. In some embodiments the neural network calculates the likelihood that a pixel represents an object, such as a roadway lane line. The neural network is trained on a dataset of annotated images, where training involves adjusting weights of network nodes. As part of training the neural network, a loss function may be used to estimate the error in the weights of the neural network and the system may adjust the weights of the neural network to minimize the loss calculated by the loss function.

In some embodiments, the system may use a convolutional neural network to extract a semantic representation of the input image. The semantic representation may be decoded by at least three separate shallow convolutional heads. Both the convolutional neural network and the shallow convolutional heads may have learned weights which may be adjusted as part of the training of the system to recognize objects of interest in some embodiments.

Figure 4:
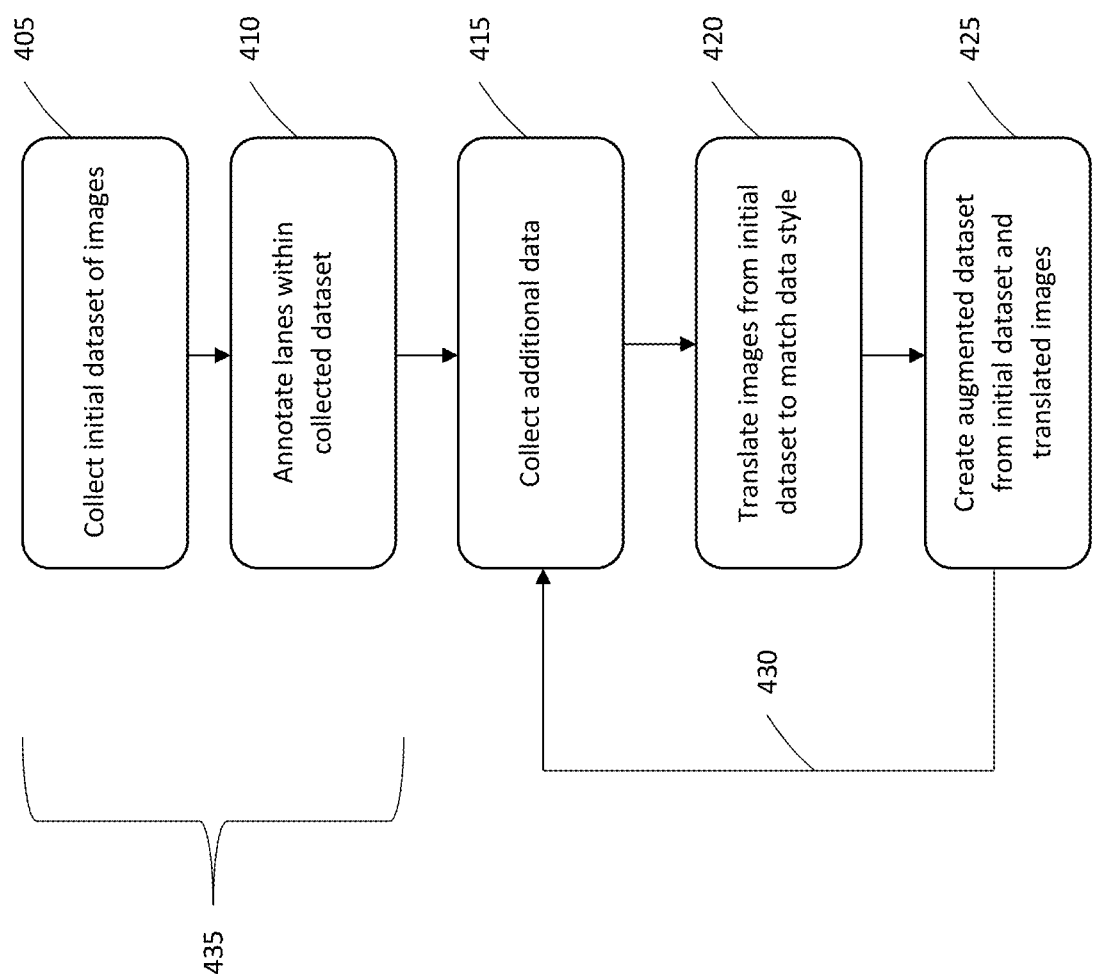
FIG. 4 is a block diagram of a data pipeline useful for augmenting an annotated dataset in accordance with one embodiment.

FIG. 4 shows a block diagram of a data pipeline useful for augmenting an annotated dataset in accordance with some embodiments. Annotated datasets are useful for training classifiers such as neural networks arranged to recognize objects within images. The annotations provide ground truth data for the system to compare to the neural network output during training. Training the neural network in some embodiments may involve supplying a training dataset to the neural network and adjusting weights within the neural network based on a comparison of the classification output of the neural network to the ground truth data.

The content of an image includes objects and relationships among objects in an image. The style of an image includes non-essential features of an image such as how objects appear. In an autonomous driving context, the content of roadway images may comprise at least one of the location of road markings, traffic signs and signals, road boundaries, other vehicles, and all of the semantic information necessary for driving. The style of roadway images may comprise at least one of the color and shape of road markings and signs, or the lighting conditions (sunny, overcast, rainy, nighttime). Applying larger training datasets that contain images that cover larger variations in objects and styles, improve the classification performance of the neural network. However, human annotation of datasets is time consuming and expensive. Embodiments disclosed herein allow a system to synthesize new annotated images covering larger style spaces without human intervention.

A processor may receive an initial data set. In some embodiments, a system may collect an initial dataset of images 405. In some embodiments, these images may be roadway images. The images may be collected from a camera or video recording device. The image recording device may be located on a vehicle or may be aerial. The image recording device may be located on a moving vehicle. In some embodiments, the initial dataset of images 405 may include images from both aerial and ground-level systems. In some embodiments, the initial dataset of images 405 may be from a satellite imager. In some embodiments, a human or computer may annotate objects such as lane objects in the collected initial data set 410. The collection of the initial data set and the annotation of the initial data set may, together, comprise a labeled data set 435. This set 435 may be limited in size.

In some embodiments, a processor may use the labelled set 435 in addition to supplemental collected data 415. The system may use comparisons between or perform other operations on the collected additional data 415 and the initial data set 405 to create a larger data set and use that larger data set in later analyses and classifier training. The collected larger data set 425 may include data subsets, organized by locales and conditions of interest.

The processor may collect additional data 415 and translate images from the initial data set 435 to match the data style 420 of the additional data 415. For example, in some embodiments, the labeled data 435 may comprise roadway images during the daytime. The system may collect additional data 415 of roadway images during the night. The system may collect additional data 415 of roadway images from different locales. The processor may translate the labeled data 435 to match the additional data 415 of nighttime roadway images and images from different locales. In some embodiments, matching the data style 420 over conditions and/or over locales are forms of domain adaptation.

In some embodiments, domain adaptation comprises applying information in labeled data in one domain to unlabeled data in a different domain. A domain may comprise, but is not limited to, image location, weather, and terrain. For example, in some embodiments, the system may translate labeled data from images of California roads to images of Nevada roads. The system may be able to translate data having at least one of different paint colors, different pavement colors, and different standardized lane marker width. The system may translate labeled data from images with rain to sunny day images in some embodiments. The system may translate labeled data from terrain, such as desert terrain, to images taken in a forest or field setting.

In some embodiments, domain adaptation comprises applying information in labeled data in a first set of conditions to unlabeled data in a different set of conditions. A condition may comprise road conditions, including weather conditions, such as ice, rain, or snow on the road. A condition may also include environmental conditions, such as dirt, sand, or rocks on the road in some embodiments. In some embodiments, the system may preserve the content of the initial data set when matching the data style 420.

In some embodiments, the system may create an augmented dataset comprising the initial dataset and translated images 425. The system may use the augmented data set as additional training data. The system may repeat 430 the data collection 415, translation 420, and augmentation 425 steps to continue to improve the data set. A larger data set, in some embodiments, may produce more accurate results when the data set is used to develop or train object detection processes such as a lane object detection process.

Some embodiments may use Multimodal Unsupervised Image-to-Image Translation (MUNIT) to translate the initial data set 405 to match the style of the additional data 415. MUNIT may be unsupervised and generative. In some embodiments, MUNIT is used to generate training examples of environmental conditions from the additional data 415.

Figure 5:
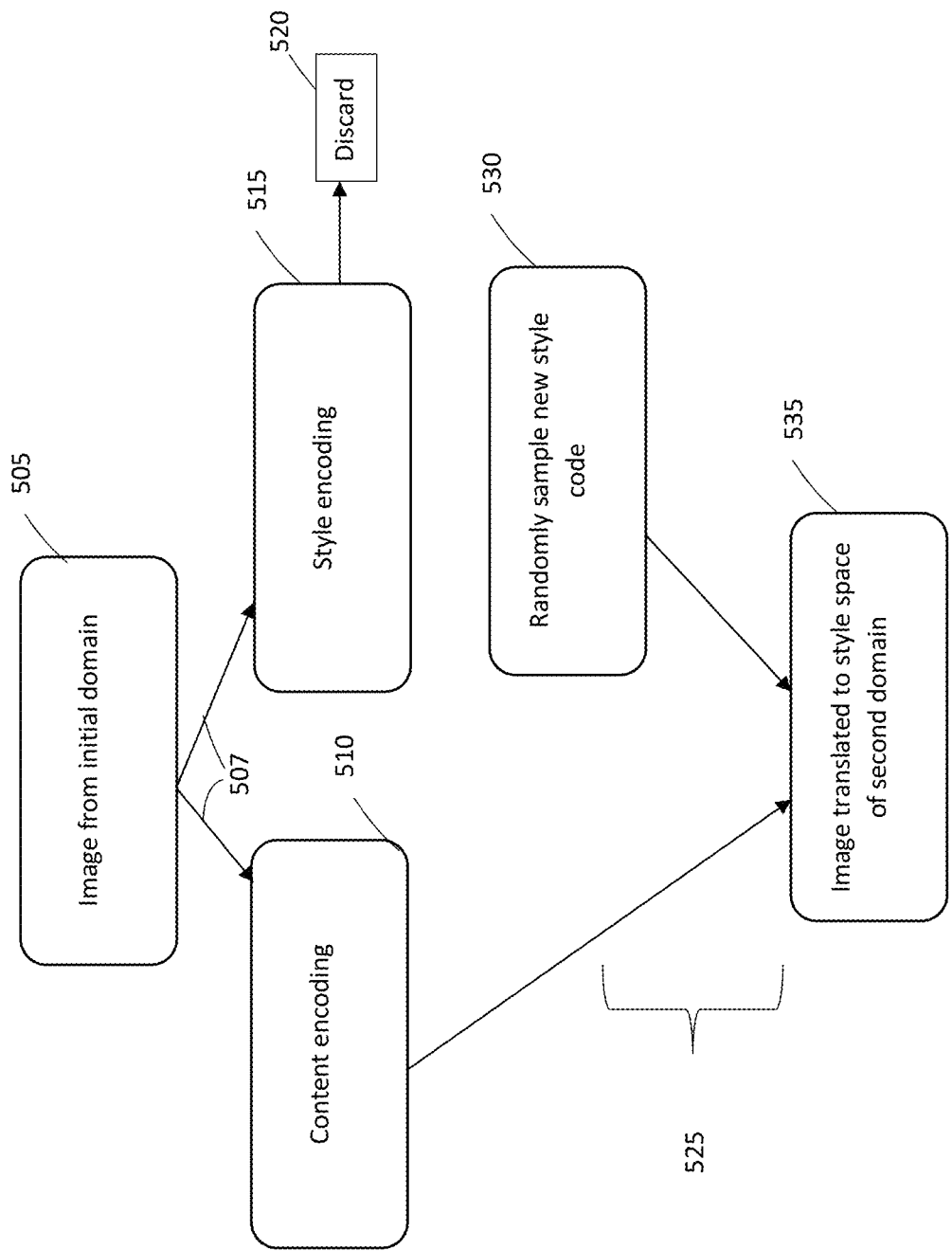
FIG. 5 is a block diagram of unsupervised style transfer in accordance with one embodiment.

FIG. 5 is a block diagram of unsupervised style transfer in accordance with one embodiment. Style transfer modifies a piece of data, such as the appearance of an image, to exhibit a new style while preserving the original content.

Domain transfer (or domain adaptation) refers to transferring the set of styles present in one domain to the set of styles in another domain. For example, a system may learn to convert a scene observed under one set of weather conditions, such as summer conditions, to the same scene under another set of weather conditions, such as winter conditions. This conversion is a domain transfer between weather conditions.

In some embodiments, a system may receive an image from an initial domain 505. In some embodiments, the system may receive the image from a camera. In some embodiments, the system may receive the image from a database. The system may extract 507 the content encoding 510 and the style encoding 515 from the image from the initial domain 505. The system may then discard 520 the style encoding 515 from the image 505. The system may then use the content encoding 510 and new style decoding 530 to translate 525 the image 505. In some embodiments, this translation may result in an image translated to a style space of a second domain 535.

The new style decoding may be learned from another dataset. In some embodiments, the dataset may be stored on the memory of a system. In some embodiments, the dataset may be a collection of other images captured by the device.

The resulting translated image may be a new image with the original content and a new style. For example, the translated image 535 may have the same road features as the image from the initial domain 505, but may have different conditions, colors, and weather than the image from the initial domain. The translated image 535 may include rainy conditions if the initial image 505 included sunny conditions. The translated image 535 may have white lane lines if the initial image 505 had yellow lane lines, etc.

Figure 6:
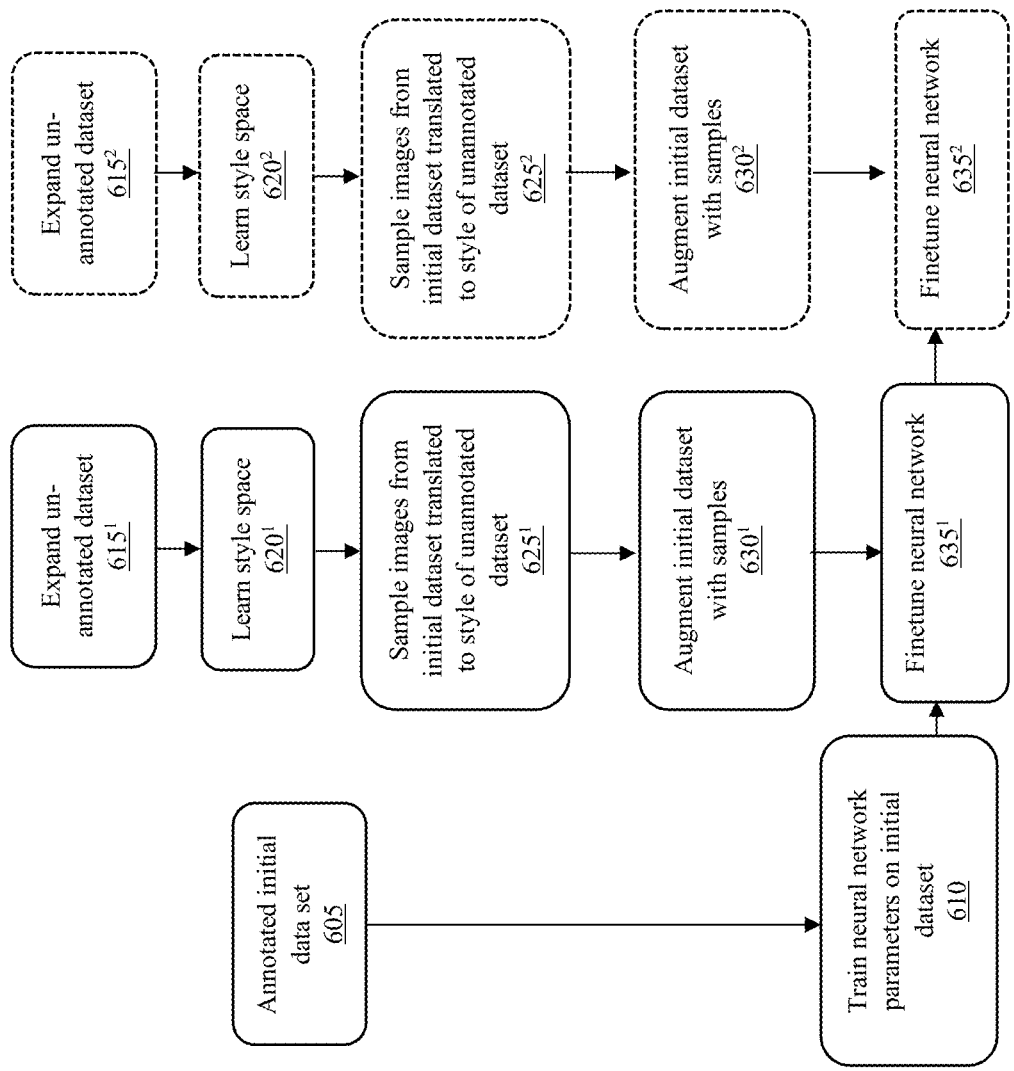
FIG. 6 is a block diagram of a method of training a neural network in accordance with one embodiment.

FIG. 6 is a block diagram of a method of training a neural network in accordance with one embodiment. In some embodiments, the processor may receive an annotated initial data set 605. The processor may train neural network parameters on the initial data set 610. In some embodiments, the loss function in the neural network may decrease as the processor continues to train neural network parameters. The system may train the neural network by introducing an additional data set 6151 or a plurality of additional data sets 6151, 6152. Although FIG. 6 shows two new additional data sets 615, the system may train the neural network on any number of data sets 615.

In some embodiments, the additional data set 6151 may be unannotated. The system may capture additional images and enter the additional images into the unannotated dataset. In some embodiments the system may learn the style space 6201 of the unannotated data set. The system may then take sample images from the initial data set 605 and translate 6251 the images to the style of the unannotated data set 6151. The system may use these translated images to augment 6301 the initial data set 605. The larger the data set, the more accurate the neural network in some embodiments. The augmented data set may be used, in some embodiments, to finetune the neural network 6351.

In some embodiments, the system may repeat the process of finetuning the neural network 635. The system may continue to capture additional unannotated images 6152 and learn the style space 6202 of the new unannotated images. The system may then take new sample images from the initial data set 605 and translate the sample images into the style 6202 of the new unannotated dataset 6252. The system may then augment the initial data set with the new samples 6302. The system may then use the augmented data set to finetune the neural network 6352. In some embodiments, the translation process may be supervised to determine if the processor is properly translating the initial dataset images to the style of the unannotated data set 625. The use of properly applied data in the training process will increase the data set and increase the accuracy of the pixel identification process in some embodiments.

The capture of unannotated datasets can be done while an object detection or lane object detection system is operating as intended in real time to detect objects. In addition to performing its object detection function, the system can record images for later use in augmenting the initial training dataset 605. The system can periodically retrain object classifiers based on the augmented training datasets. Retraining would typically occur offline. For the case of an object detection system used within a vehicle system, such as an autonomous driving system, many instances of the same system may be operating in different vehicles located in different locales operated at different times. Image data can be captured from multiple operating vehicle systems and uploaded to a central server for processing. The central server can perform the style transfer to synthesize new annotated training data based on existing annotated datasets and extracted style information from the newly captured data. The synthesized data can then be used to retrain a representative neural network classifier and provide updated network weights. The updated weights can be downloaded to the individual instances of the object detection systems operating in vehicles in the field via an over the air software update protocol. Over the air software updates for vehicle are well known, one example of which being the over the air software updates performed by Tesla, Inc. of: 3500 Deer Creek Road, Palo Alto, CA 94304, for its fleet of electric vehicles.

In some embodiments, an object detection system may perform all the steps of data capture, image style transfer and updated training by itself, without the need to use centralized resources.

In some embodiments, the system may combat drifting through training via reinforcement learning. In some embodiments, the system may combat drifting through training to denoise perturbed lane annotations. In some embodiments, the system may augment datasets with synthesized perturbations to the starting pixel from which the next pixel is predicted by adding Gaussian noise to train the network.

Figure 7:
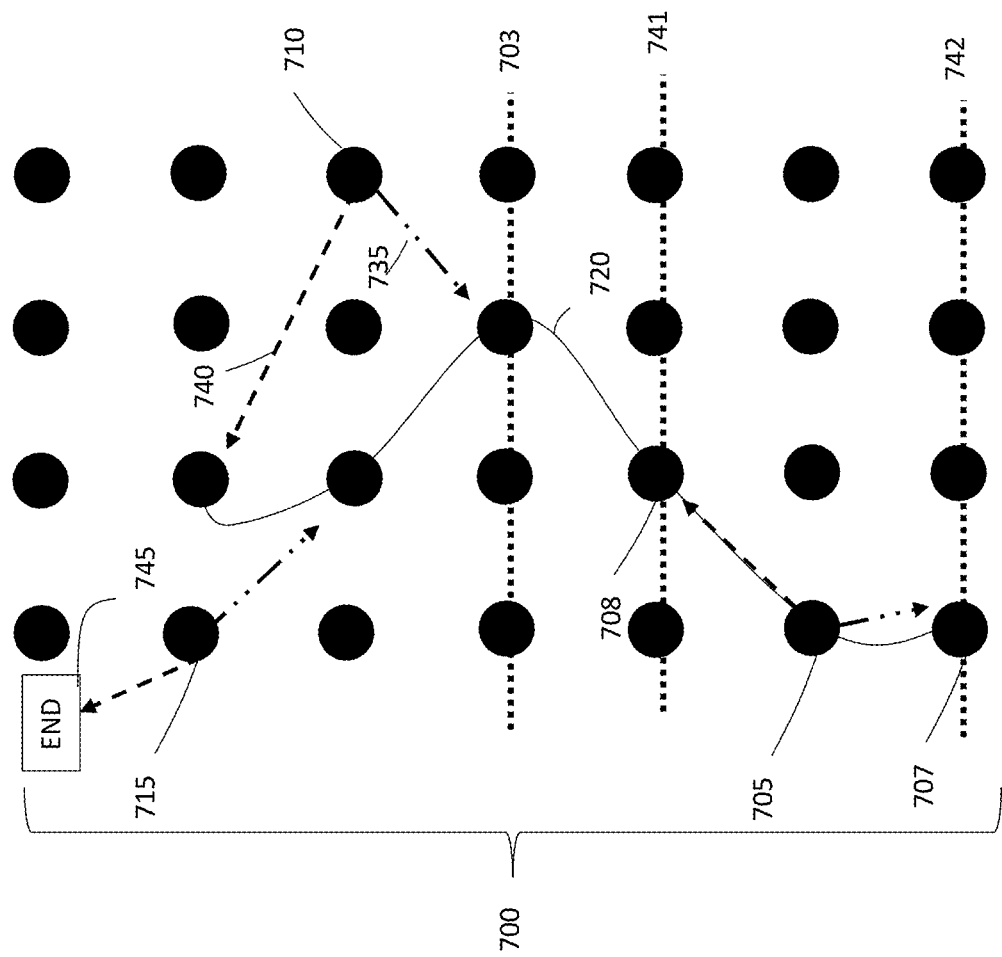
FIG. 7 is a diagram representing system prediction of pixels that are part of a detected object and end tokens in accordance with one embodiment.

FIG. 7 is a diagram representing system prediction of pixels that are part of a detected object and end tokens in accordance with one embodiment. In some embodiments, the system may receive an image comprising a set of pixels 700 arranged in rows 703, 741, 742. In some embodiments, the system is configured to assign a probability of being part of a lane to each pixel 700. The probabilities are obtained from a trained neural network classifier. The system may select a starting pixel 705 and may evaluate pixels in the row above 741 and the row below 742 the starting pixel 705. Selection of a starting pixel is further illustrated by FIGS. 8 and 9. The evaluation process may include assigning probability values of being part of the lane to a subset of the pixels residing in the rows above 741 and the row below 742 the row of starting pixel 705. By looking at rows above and/or below the starting pixel, and by looking at a subset of the pixels in each row, the size of the neural network classifier may be substantially reduced compared to systems configured to evaluate an entire image at the same time. This substantially increases the speed of object detection in some embodiments.

The system may determine that pixel 708 in row 741 and pixel 707 in row 742 to be the pixels having the highest probability of being part of the lane of any of the pixels in the respective rows 741, 742. In some embodiments, the system may determine which pixels in an adjacent row exceed a probability threshold of being part of the object to be detected. In some objects, the object to be detected is a lane object. The system may select any of the pixels with probabilities that exceed the threshold as the next pixel. The system may select the pixel closest to the midpoint of the set of pixels with probabilities that exceed the threshold in the adjacent row. The system may connect the pixels 708, 705, 707 with a curve 720. The system may then use the second pixel 708 as a starting pixel to determine the pixel in the adjacent row 703 most likely to be part of the lane. The system may continue to iteratively use identified pixels to identify adjacent row pixels as start pixels and secondary pixels.

In some embodiments, during training the system may similarly attempt to predict local object shape or detect an object. During training, the system may compare the output of pixels identified as being part of the object to the ground truth data provided by the annotations in the training data. The system may use differences between the detector output and the ground truth data to refine weights of the neural network classifier in some embodiments.

The system may perform a synthetic perturbation of a starting pixel 710 offset from annotated lanes and may maintain the training label pointing back to the lane 720. In some embodiments, the offset pixel 710 may include upward 740 and downward 735 directions for the determined lane shape, represented by curve 720. In some embodiments, a synthetically perturbed pixel 715 may signal the termination of a lane, represented by curve 720 with an end token 745. In some embodiments, the system may draw a lane, represented by curve 720 by sampling an initial point 705 and then greedily following arrows 735, 740 up and down until the system reaches an end 715 in either direction. The system may then concatenate the results.

In some embodiments, a processor may draw a line segment between each identified adjacent row pixel. Drawing polylines comprises drawing a set of connected line segments. In some embodiments, a processor may fit a curve 720 through a set of adjacent row pixels to form a lane line. The system may proceed as described above to identify pixels throughout the image that are part of the object to be identified, such as a lane object. In some embodiments, rather than drawing a line from one pixel to the next at each step in the iterative process, each of the identified pixels are stored in memory. Once the system has proceeded through each row in the image that may contains pixels that may be part of the object, the system may perform a curve fit operation on the set of detected pixels.

Figure 8:
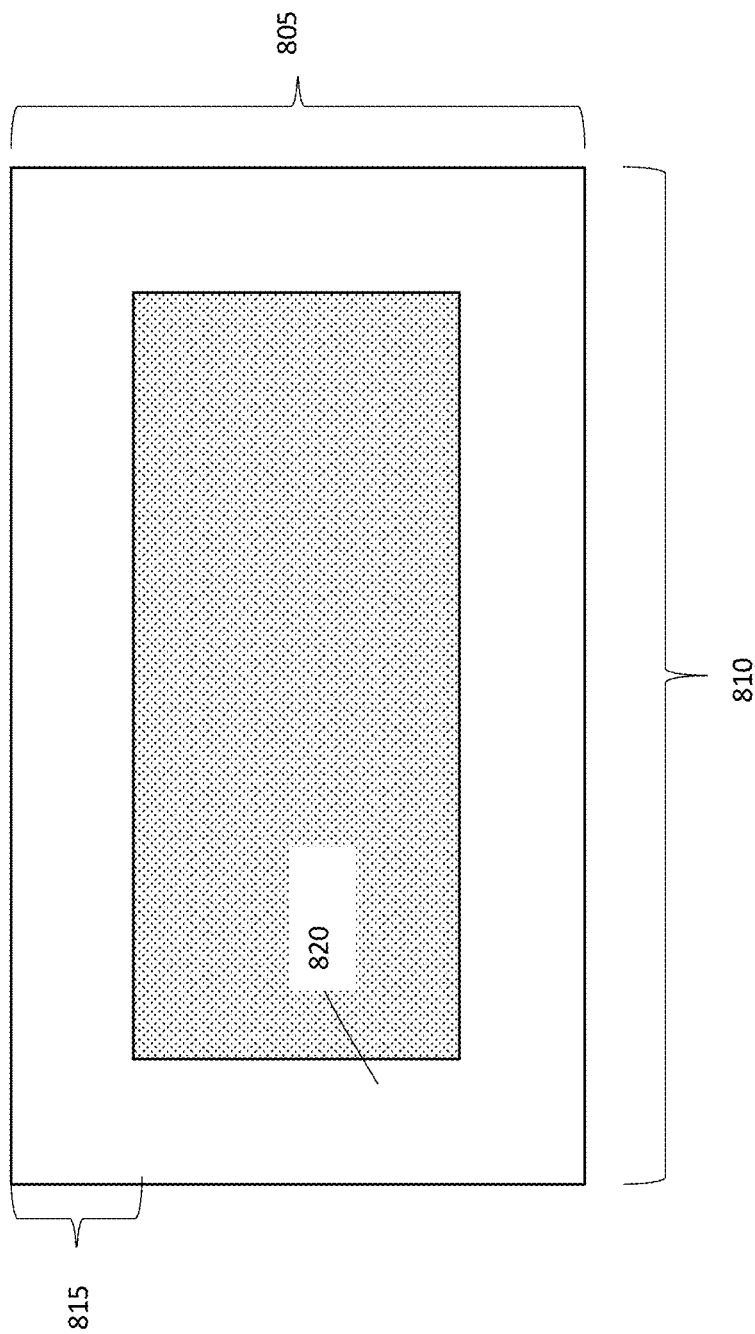
FIG. 8 depicts a method for detecting initial lane points in an image in accordance with one embodiment.

FIG. 8 depicts a method for detecting initial lane points in an image in accordance with one embodiment. While FIGS. 8 and 9 are illustrated in the context of detecting lane objects, the object detection systems and methods disclosed herein are not limited to the detection of lane objects and can be used to detect other types of objects in images (for example, sign posts, traffic lights, body parts, etc.). As discussed above, the system may consider a region of interest of the image. For example, in some embodiments, the region of interest 820 may be around the border of the image. The region of interest 820 may be a function of the height 805 and the width 810 of the image. The region of interest may take a border 815 of equal width around the image to identify initial lane points. For example, the system may consider a region of width 0.15*w around the border of the image, where w is the width of the image. In other embodiments, the system may consider a region of width 0.15*h around the border of the image, where h is the height of the image. The system may consider regions in the center of the image in some embodiments.

FIG. 9 depicts a method of masking image and analyzing the region of interest 902 in accordance with some embodiments. In some embodiments, a captured image may comprise pixels arranged on a grid. The system may translate the image into a probability heatmap 905, calculating the probability that each pixel is part of a lane. In some embodiments, the system may calculate the probability heat map 905 for each pixel in the region of interest 902. For ease of visualization, pixels with a higher probability may be depicted as being larger, darker, or a different color than pixels with a lower probability. FIG. 9 represents pixels with higher probabilities as dots of larger diameter.

In some embodiments, the system may apply a mask 907 to the image (step 910) and may generate a heat map showing the pixel coordinates 909 in the unmasked region 902. The heat map of the unmasked region in step 910 may be identical to the heat map of the unmasked region 905 in some embodiments. The system may ignore the masked region of the system 907 and separately analyze the pixels in the region of interest 902 to determine a set of pixel coordinates 909 in some embodiments. Embodiments may then cluster the pixels 915 from a cloud of pixels which are most likely to be part of an object. Some embodiments may use the DBSCAN algorithm disclosed in: "A density-based algorithm for discovering clusters in large spatial databases with noise," Proceedings of the Second International Conference on Knowledge Discovery and Data Mining (KDD-96). AAAI Press. pp. 226-231, CiteSeerX 10.1.1.121.9220. ISBN 1-57735-004-9, the entire disclosure of which is hereby incorporated by reference as if set forth in its entirety herein, to cluster the pixels. In some embodiments, systems may use other known clustering algorithms such as HDBSCAN, OPTICS, K-means, etc. In some embodiments, clustering pixels may allow the system to ignore stray pixels 911 assigned high probabilities of being part of a lane object, but not surrounded by other pixels with similarly high probabilities.

In some embodiments, the system may determine a set of starting pixels, one starting pixel in each cluster that are most likely to be part of lane objects 920, to be selected as the starting pixels for detecting objects within this image. The system may use these starting pixels to iteratively determine pixels in other rows of the image that are also part of the objects to be detected, and lines that represent the objects are drawn 925 as previously described. In some embodiments, the pixels may be used as edges of a lane, rather than the center of a lane. In these embodiments, the system may use two pixels as borders of a lane, rather than a system using one pixel as a center of a lane.

Figure 10:
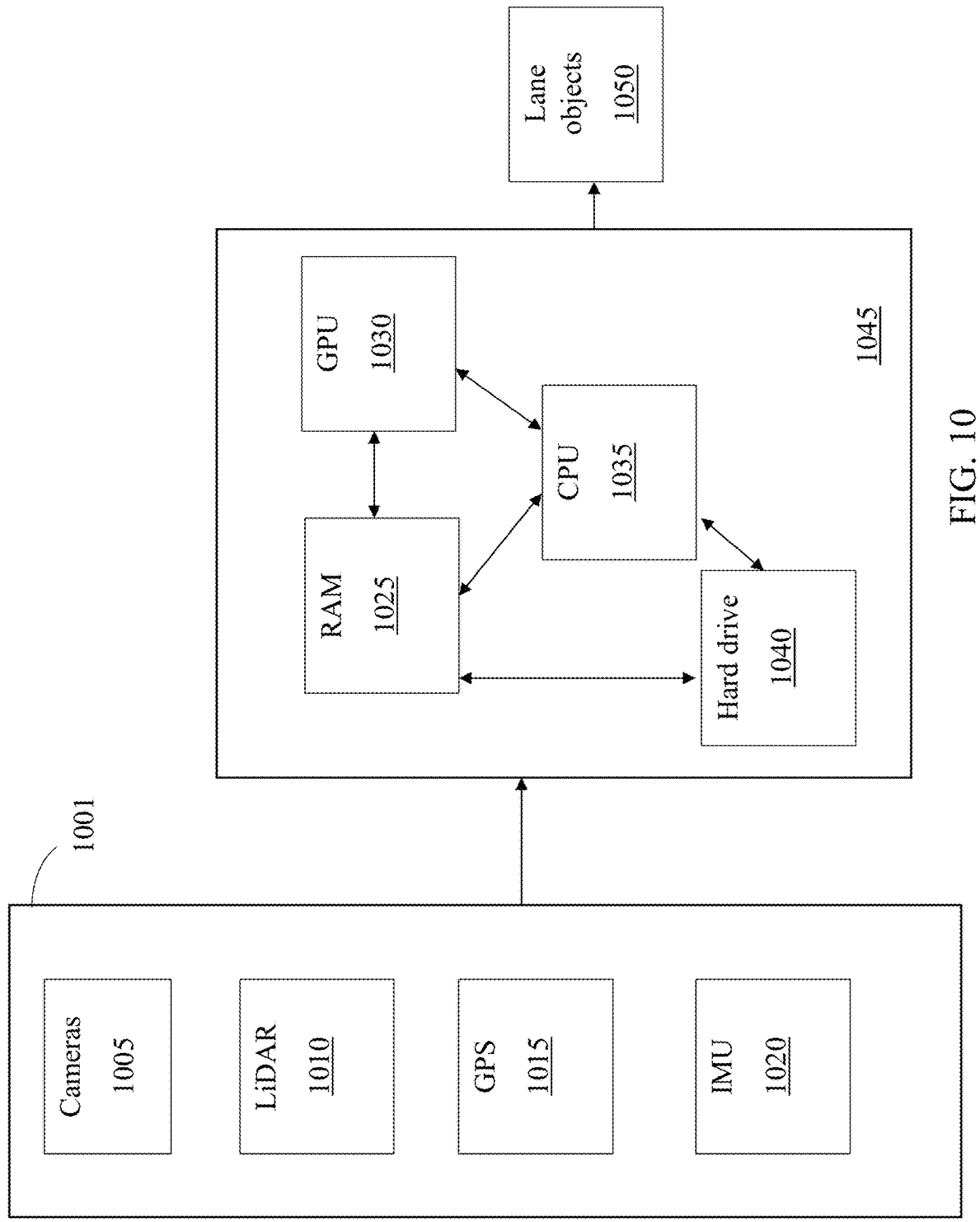
FIG. 10 depicts hardware for the system in accordance with one embodiment.

FIG. 10 depicts hardware for the system in accordance with one embodiment. The system may receive an image input 1001 from at least one source. In some embodiments, the source may include a camera 1005, LiDAR 1010, GPS 1015, and IMUS 1020. In some embodiments, the system may receive inputs from a plurality of sources. For example, the system may receive position input from a global positioning system and may receive measurement data from an IMU. In some embodiments, the system may receive inputs from multiple sensors simultaneously. The system may process the sensor inputs and the computing system performs object detection in real time (i.e., with sufficiently low latency) such that object detection output may be available for other vehicle systems, such as a motion planning system of an autonomous driving system to beneficially use.

In some embodiments, the input 1001 may be sent to computing system such as a processor 1045. The processor 1045 may analyze the input 1001 with a central processing unit (CPU) 1035. The CPU 1035 may communicate with the hard drive 1040, graphics processing unit (GPU) 1030, and random-access memory (RAM) 1025. In some embodiments, the CPU 1035 may be able to receive input from the hard drive 1040, GPU 1030, and RAM 1025. In some embodiments, the CPU 1035 may be able to send data and commands to the hard drive 1040, GPU 1030, and RAM 1025. The communication among the CPU 1035, the hard drive 1040, GPU 1030, and RAM 1025 may produce an output from the processor 1045. The processor 1045 may use the image input 1001 to detect an object in the image input. For example, the processor 1045 may identify a lane object such as a lane marking or a lane boundary in the image input 1001. After identifying the lane object, the processor may output the lane object 1050.

FIGS. 11A-D depict the behavior of an example object detection system on four different images included as part of a testing dataset used to evaluate performance of the object detection system in accordance with one embodiment. In some embodiments, the system may augment training datasets by using style transfer to synthesize additional training data.

For each of FIGS. 11A-D, slides 1101', 1101", 1101''', 1101'''' depict a line drawing representation of an input testing image, in accordance with some embodiments. Slides 1102', 1102", 1102''', 1102'''' depict the per pixel likelihood calculated by the object detection system that a pixel is part of a lane object within the image, where an object classifier in the object detection system is trained on a first training dataset, in accordance with some embodiments. Slides 1103', 1103", 1103''', 1103'''' depict the per pixel likelihoods calculated in slides 1102', 1102", 1102''', 1102'''' overlaid upon the image of slides 1101', 1101", 1101''', 1101''''. Slides 1104', 1104", 1104''', 1104'''' depict the per pixel likelihood calculated by the object detection system that a pixel is part of a lane object within the image, where the object classifier in the object detection system is trained on a second training dataset including synthesized image data obtained via style transfer, in accordance with some embodiments. Slides 1105', 1105", 1105''', 1105'''' depict the per pixel likelihoods of slides 1103', 1103", 1103''', 1103'''' overlaid upon image from slides 1101', 1101", 1101''', 1101'''', respectively.

Figure 11A:
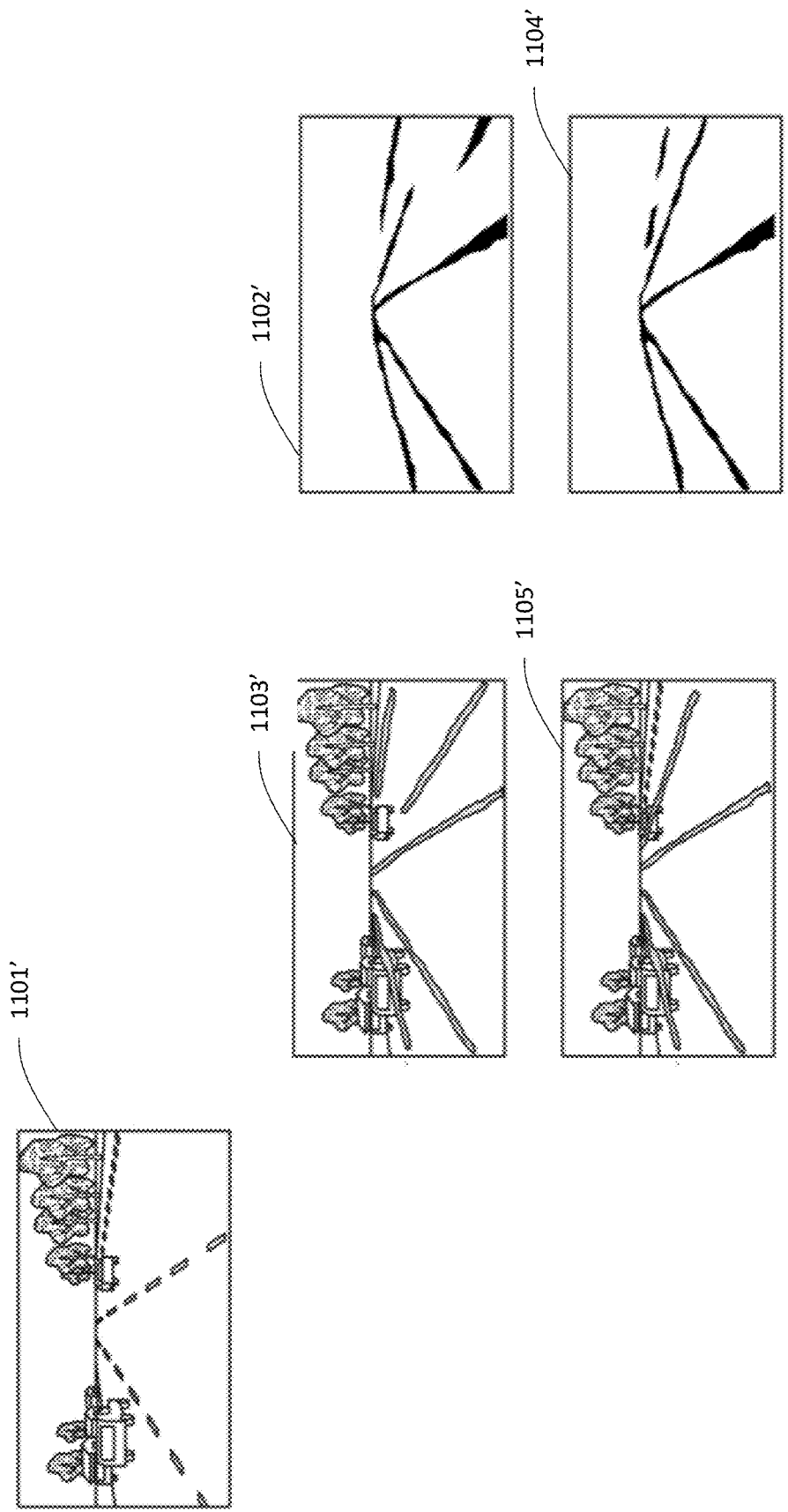
FIGS. 11A-D depict the behavior of an example object detection system on four different images included as part of a testing dataset used to evaluate performance of the object detection system in accordance with one embodiment.
Figure 11B:
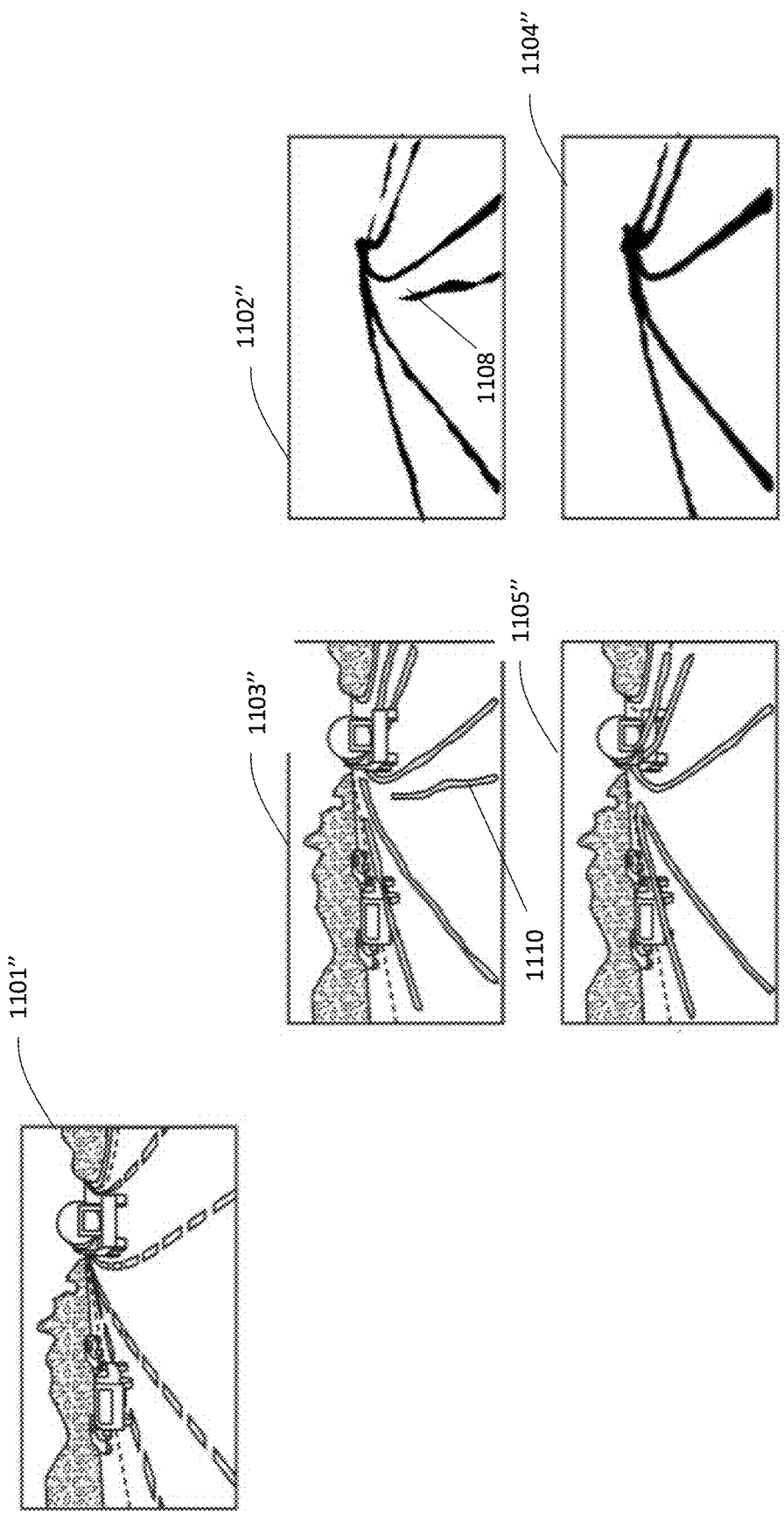
Figure 11C:
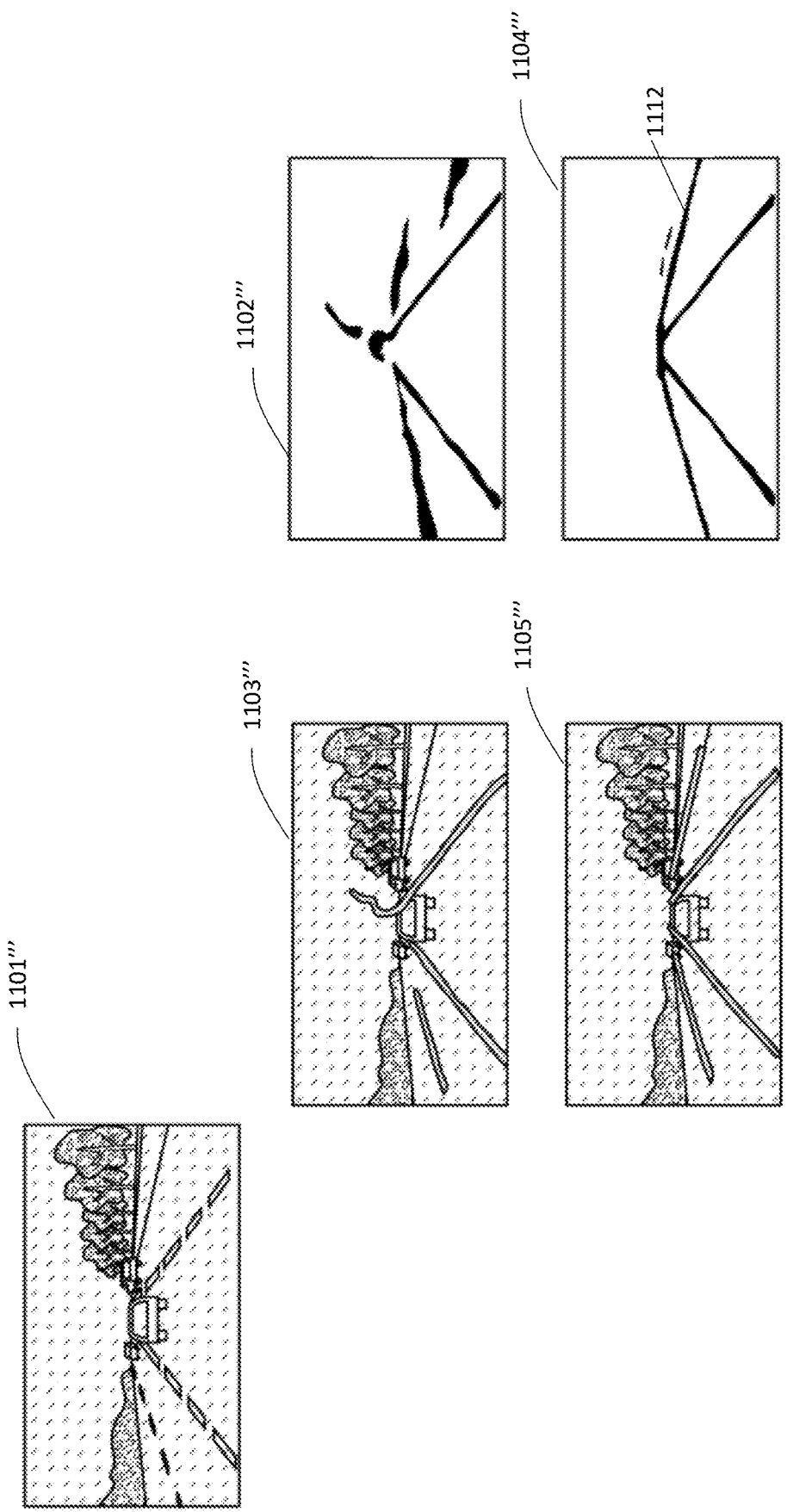
Figure 11D:
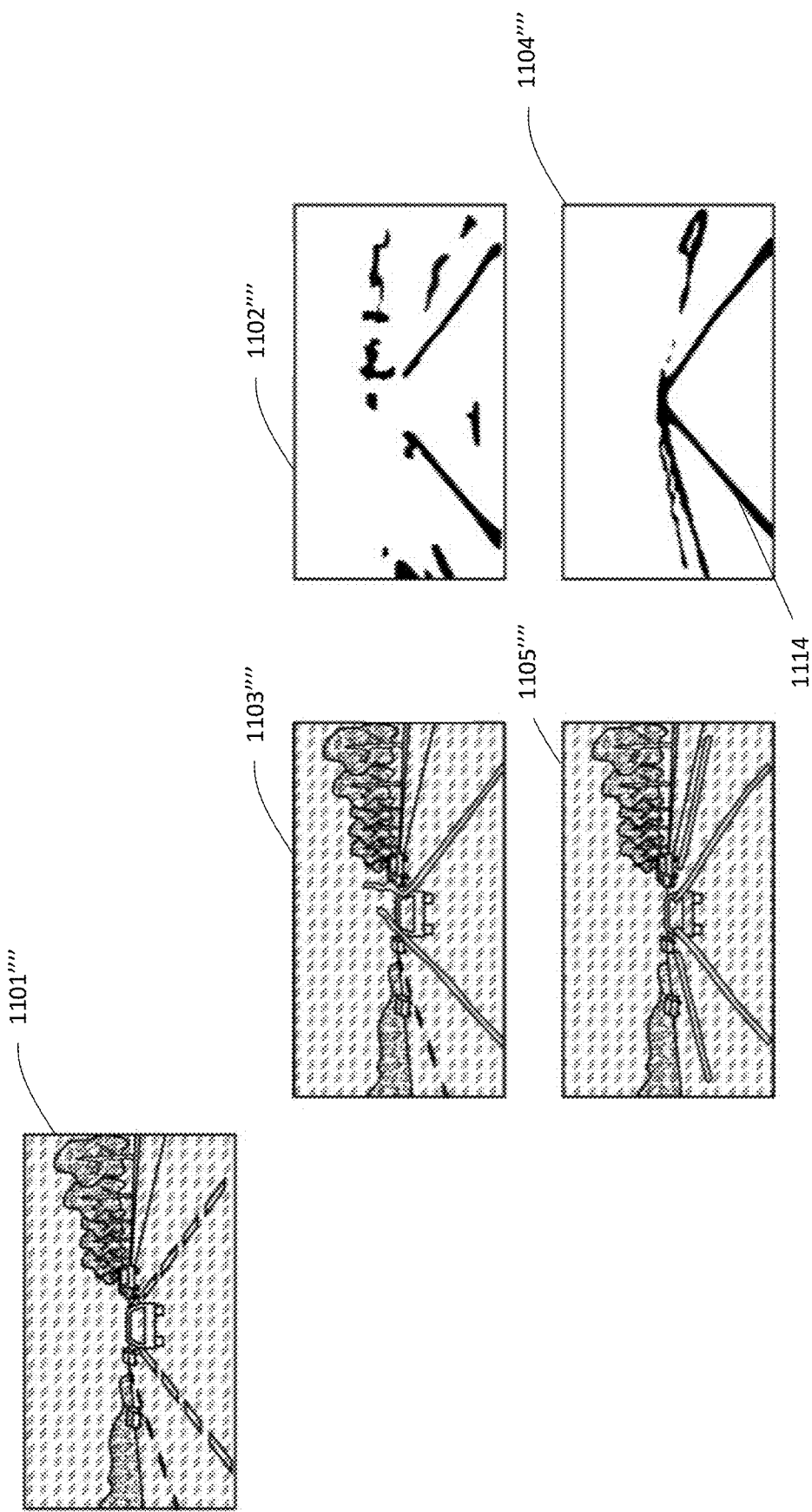

In FIG. 11A, slides 1102' and 1103' show a discontinuity in the right most lane boundary whereas slides 1104' and 1105' show a continuous lane boundary. In FIG. 11B, embodiments may improve boundary detection from showing a discontinuity 1108, 1110 in slides 1102" and 1103" that is absent from slides 1104" and 1105". Similar improvements in the identification of lane objects are visible in FIGS. 11C and 11D as well, where lane objects 1112, 1114 are missing in slides 1102''', 1102'''' and 1103''', 1103'''' but are present in slides 1104''', 1104'''' and 1105''', 1105''''. The improvement in detection of lane objects may be clearer when the system is trained on the second training dataset which may include images synthesized using style transfer in some embodiments.

A mathematical explanation concerning embodiments of a lane representation method is provided below. In the most general case, lane annotations are curves $\gamma:[0,1] \to R^2$. In order to control the orientation of the lanes, some embodiments assume that lane annotations can be written as a function of the vertical axis of the image. A lane annotation y therefore is represented in some embodiments by a sequence of {height, width} pixel coordinates $y=\{y_1, \ldots, y_n\}=\{\{h_1,w_1\}, \ldots \{h_n,w_n\}\}$ where $h_{i+1}-h_i=1$. Given an image $x \in R^{3 \times H \times W}$, the joint probability $p(y|x)$ can be factored as follows:

$$p(y|x)=p(y_1|x)\Pi_{i=1}^{n-1} p(y_{i+1}|y_1, \ldots, y_i, x) \quad (1)$$

Some embodiments may use a recurrent neural network to predict $p(y_{i+1}|y_1, \ldots, y_i, x)$. To decode the neural network, some embodiments assume most of the dependency can be captured by conditioning only on the previous decoded coordinate:

$$p(y|x) \approx p(y_1|x)\Pi_{i=1}^{n-1} p(y_{i+1}|y_i,x) \quad (2)$$

Because embodiments may assume $h_{i+1}-h_i=1$, the processor may simplify the probability as:

$$p(y_{i+1}|y_i,x)=p(\Delta w_i|y_i,x) \quad (3)$$

$$\Delta w_i = w_{i+1} - w_i. \quad (4)$$

In some embodiments, lane detection may be reduced to predicting a distribution over dw/dh at every pixel in addition to the standard per-pixel likelihood. Decoding proceeds by choosing an initial pixel coordinate and integrating. To represent the distribution $p(\Delta w_i|y_i,x)$, embodiments may use a normal distribution and perform regression. In cases where the true distribution is multi-modal such as when lanes split, a regression output may cause the network to take the mean of the two paths instead of capturing the multimodality. Some embodiments may make no assumptions about the shape of $p(\Delta w_i|y_i,x)$ and represent the pairwise distributions using categorical distributions with support $\Delta w \in \{i \in Z | -L \le i \le L\} \cup \{end\}$ where L is chosen large enough to be able to cover nearly-horizontal lanes and end is a stop token signaling the end of the lane. At each pixel{h,w}, the neural network may predict (1) $p_{h,w,0}:=p(h,w|x)$—the probability that pixel {h,w} is part of a lane, (2) $p_{h,w,i}:=p(\{h+1,\Delta w\} \cup end|h,w,x)$—the categorical distribution over pixels in the row above pixel {h,w} within a distance L that pixel {h+1,w+$\Delta w$} is part of the same lane as pixel {h,w}, or that pixel {h,w} is the top pixel in the lane it is a part of, (3)$p_{h,w,-1}:=p(\{h-1,\Delta w\} \cup end|h,w,x)$—the categorical distribution over pixels in the row below pixel {h,w} within a distance L that pixel {h-1,w+$\Delta w$} is part of the same lane as pixel {h,w}, or that pixel {h,w} is the bottom pixel in the lane it is a part of.

Given these probabilities, embodiments may decode a full lane segment given any initial point on the lane. Given some initial position $h_0,w_0$ on lane y, embodiments may follow the greedy recursion:

$$y(h_0)=w_0 \qquad (5)$$

$$y(x+\text{sign})=y(x)+\Delta w \qquad (6)$$

$$\Delta x=-L+\text{argmax } p_{x,y(x),\text{sign}} \qquad (7)$$

where sign$\in \{-1,1\}$ depending on if the system draws the lane upwards or downwards from $x_0,y_0$. Some embodiments may choose any $y_i \in y$ as $h_0,w_0$ and may concatenate the results from the upwards and downwards trajectories. Embodiments may stop decoding when argmax returns the end token.

As previously discussed, the loss function in the neural network may decrease as the processor continues to train neural network parameters. In some embodiments, system may minimize the negative log likelihood given by $p(y|x) \approx p(y_1|x)\Pi_{i=1}^{n-1} p(y_{i+1}|y_i,x)$ to calculate loss. The negative log likelihood may be the joint probability of a sequence of pixels being a lane. The loss $L(\theta)$ may be defined by:

$$L_{mask}(\theta)=-\log(p(y_m|f_\theta(x))) \qquad (8)$$

$$L_{sequence}(\theta)=\Sigma_{s \in \{-1,1\}} \Sigma_{i=1}^n \log(p(w_{i+s}-w_i|\{h_i,w_i\},f_\theta(x))) \qquad (9)$$

$$L(\theta)=L_{mask}(\theta)+L_{sequence}(\theta) \qquad (10)$$

where $\theta$ represent the weights of the network, $x \in R^{3,H,W}$ an input image, and $y=\{\{h_1,w_1\}, \ldots, \{h_n,w_n\}\}$ a ground truth lane annotation such that $h_i-h_{i-1}=1$ and $y_m \in R^{1,H,W}$ a ground truth segmentation mask of the lane.

Because the task of binary segmentation and pairwise prediction have different uncertainties and scales, embodiments may dynamically weight these two objectives. Some embodiments may incorporate a learned temperature a which is task specific to weigh the loss:

$$L(\theta) = \frac{1}{\sigma_{mask}^2} L_{mask}(\theta) + \frac{1}{\sigma_{sequence}^2} L_{sequence} + \log \sigma_{mask}^2 \sigma_{sequence}^2 \qquad (11)$$

During training, embodiments may substitute $W=\log \sigma^2$ into (11) for numerical stability. In some embodiments, a fixed W may result in a similar system performance to allowing W to be learnable.

Embodiments may correct for exposure bias in object detection. Embodiments may train the neural network to denoise lane annotations and augment datasets with synthesized perturbations. In some embodiments, to each ground truth annotation (y), the system may add gaussian noise and train the network to predict the same target as the pixels in y. Embodiments may generate training examples as follows:

$$s \sim [N(0.5,\sigma)] \qquad (12)$$

$$w_i'=w_i+s \qquad (13)$$

$$p(w_{i+sign}-w_i'|\{h_i,w_i'\},x)=y(h_i+\text{sign})-w_i'+L \qquad (14)$$

where sign$\in \{-1,1\}$. Some embodiments may tune $\sigma$ as a hyperparameter which is dependent on dataset and image size. In some embodiments, the system may clamp the ground truth difference $y(h_i+\text{sign})-w_i'+L$ between 0 and 2L+1 and clamp w' between 0 and the width of the image.

Some embodiments may perform style transfer on the images in unordered datasets D and D'. In some embodiments, a framework such as the CycleGAN framework may train an encoder-generator pair E,G for each dataset D and D' such that $G(E(x)) \approx x$ for $x \sim D$ and difference between the distributions $y \sim G'(E(x))$ and $y \sim D'$ is minimized, with analogous statements for D'. The multimodal unsupervised image-to-image translation framework may generalize this model to include a style vector $s \sim N(0,I)$ as input to the encoder E. Style translations are distributions that can be sampled from instead of deterministic predictions in some embodiments.

Some embodiments use multimodal unsupervised image-to-image translation to augment the labeled training set with difficult training examples. In some embodiments, $D=\{x_i,y_i\}$ is a dataset of images $x_i$ and lane annotations $y_i$ and $D'=\{x_i\}$ a corpus of images without labels. Style transfer may preserve the geometric content of input images. Embodiments may generate new training examples $\{x',y'\}$ by sampling from the distribution $D' \sim \{x',y'\}$ defined by:

$$x,y \sim D \qquad (15)$$

$$x' \sim G'(E(x,s))_{s \sim N(0,1)} \qquad (16)$$

$$y'=y \qquad (17)$$

Although representation of lanes around the world are location dependent, the distribution of lane geometries may be considered constant in some embodiments. Unsupervised style transfer may allow the system to adjust to different styles and weather conditions without the need to additional human annotation.

In some embodiments, the processor may identify a plurality of roadway lanes in an image. In some embodiments, the roadway lanes may split. When the roadway lanes split, embodiments may represent pairwise distributions using categorical distributions with support. A full lane segment may be determined given an initial point. Embodiments may use a greedy recursions to determine lane trajectories and, from these trajectories, may determine polylines representing a lane.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

Autonomous driving systems rely on precise vehicle location data. An autonomous planning subsystem of an autonomous driving system may use vehicle location data for motion or route planning. Various sensors such as global positioning systems (GPS), light detection and ranging (LiDAR), Inertial Measurement Units (IMU's) and cameras (used for object detection) may all be used to provide data useful for vehicle location detection. Systems may weigh sensor output data and estimate the location of an object based on sensor outputs used together to provide a sensor fused vehicle location estimate.

In some embodiments, a motion planning subsystem increases a weight applied to an output of a subsystem for detecting surrounding objects relative to another weight applied to a separate output of the lane object detection system in order to plan a lateral position of the vehicle on a roadway. In some embodiments, an object detection subsystem may detect both objects surrounding the vehicle and lane objects. In some embodiments, a motion planning subsystem increases a weight applied to an output of a sensor system such as a LiDAR system, an IMU or a GPS system relative to another weight applied to an output of a lane object detection system in order to plan lateral position of a vehicle on a roadway. In some embodiments, the change in weights of outputs may be applied when an uncertainty of a lane object detected by the lane object detection system is above a threshold.

Some embodiments may use an uncertainty measure for sensor output data to adjust the weighting of that sensor's output when forming the fused vehicle location estimate. For example, GPS satellite communication may be lost or obscured when driving through mountainous terrain or through tunnels, LiDAR data may become noisy when heavy snow is falling, and IMU output may drift over time. As the uncertainty regarding a particular sensor or detector output increases, its weighting may be lowered so the uncertain data has less influence on the fused vehicle location estimate in some embodiments.

In winter, it may be the case that snow is falling and road surfaces are partially or completely snow covered. In such conditions, humans often have difficulty in determining exactly where lanes are located. A human driver in such circumstances will often slow down and increase the follow distance. If there are many surrounding objects, the risk to moving outside of a lane boundary is high and a human operator may be more conservative in how they drive. If there are few surrounding objects, a human operator may not worry quite as much about lane boundaries and will ensure they stay on the road surface, even if they drift over lane boundaries. An autonomous vehicle may operate in a similar manner to a human under such deteriorated operating conditions. The uncertainty measure provides a representation to the autonomous vehicle of the degraded operating conditions.

In some embodiments, an object detection system that computes for each pixel a probability that the pixel is part of an object such as a lane object may provide a natural measure of uncertainty. The characteristics of the spatial distribution of calculated probabilities may provide a measure of uncertainty in some embodiments. In some embodiments, a wider distribution of probabilities about a pixel may correlate with higher uncertainty that an object is being detected. In some embodiments, the uncertainty in the neural network classifier output in an object detection system may increase in occluded and shadowy conditions. An autonomous driving system may use the known increase in uncertainty to prevent reckless driving in high-uncertainty situations.

Lateral location of an autonomous vehicle on a roadway may be controlled by the autonomous system using the output of a lane object detection system in some embodiments. In some embodiments, the autonomous system may sense the presence of surrounding objects, such as other vehicles, on the road. When uncertainty of detected lane objects is low, a motion planning subsystem of an autonomous vehicle may weigh the output of the lane object detection more highly than the presence of surrounding objects, and rely upon the lane object detection system to guide lateral positioning of the vehicle on the road.

As the uncertainty of the lane object detection increases, the lane object detection system may no longer be relied upon to reliably guide lateral lane positioning. In such circumstances, a motion planning subsystem of an autonomous vehicle may weight lane object detection output lower (or possibly completely disregard the output from the lane object detection system) and rely more or completely on the detection of surrounding objects to guide lateral positioning of the vehicle on the roadway in some embodiments. Embodiments may continuously or discretely vary the weighting of lane object detection as a function of uncertainty of the lane object detection. Embodiments may reduce the weighting of a lane object detection system when the uncertainty increases above a predetermined threshold.

In one non limiting example, the system may use the output of a lane object detector operating on image data in combination with high definition road maps to provide an estimate of vehicle location. This vehicle location estimate may be fused with other vehicle location estimates provided by other vehicle sensor systems such as GPS, LiDAR, etc. When uncertainty in the identification of lane objects increases, the weighting of the lane object detection-based vehicle location estimate may be reduced relative to other vehicle location estimates, so it has less influence on the fused vehicle location estimate. Other systems for generating vehicle location estimates may also have associated uncertainty measures. For example, a LiDAR may have an uncertainty measure that is a function of the signal to noise ration of its output, where the uncertainty measure increases as the signal to noise ratio decreases. A GPS system may have an associated uncertainty measure that is a function of received satellite signal strength, where the uncertainty increases as the received signal strength decreases. The weighting of various location estimates can be increased when uncertainty is low and decreased when uncertainty is high. In this way, robustness of the fused vehicle location estimate is made more robust in some embodiments.

Embodiments of an autonomous vehicle planning subsystem may adjust certain parameters to control behavior of the autonomous vehicle. Some of these parameters affect how safely the vehicle operates. An autonomous planning subsystem may adjust a parameter or parameters related to vehicle speed (speed relative to the posted speed limit and/or speed relative to the speed of surrounding traffic) as a function of the uncertainty of the vehicle location estimate. The planning system may adjust a parameter for vehicle follow distance as a function of the uncertainty in the vehicle location estimate. The planning system may adjust a parameter to control when a vehicle is allowed to or is inhibited from changing lanes as a function of the uncertainty in the vehicle location estimate. In one non-limiting example, a motion planning subsystem of an autonomous vehicle may reduce speed, increase follow distance, inhibit lane changes, or any combination thereof when the uncertainty in the vehicle location estimate increases. The adjustments may be continuous or discrete functions of the uncertainty. The adjustments may be performed when uncertainty exceeds a preset threshold. Systems may comprise more than one threshold above which parameters are adjusted. The manner in which the planning system alters safety related parameters as a function of the uncertainty in a vehicle location estimate may be determined by the architect of the autonomous system.

In one non-limiting example, a planning subsystem may adjust parameters that affect the operating safety of an autonomous vehicle as a function of the uncertainty in the detection of lane objects in image data. As the uncertainty increases, a planning subsystem may reduce vehicle speed. A planning system may increase the follow distance between two vehicles. The planning subsystem may reduce speed and or increase follow distance when the uncertainty in lane object detection exceeds a predetermined threshold. The planning subsystem may continuously vary vehicle speed and follow distance as a function of uncertainty in lane object detection. A planning subsystem may continuously vary vehicle speed and follow distance as a function of uncertainty in lane object detection once uncertainty exceeds a preset threshold.

The description and illustration of one or more embodiments provided in this application are not intended to limit or restrict the scope of the present disclosure as claimed in any way. The embodiments, examples, and details provided in this application are considered sufficient to convey possession and enable others to make and use the best mode of the claimed embodiments. The claimed embodiments should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed embodiments.

What is claimed is:

1. A method for identifying an object in an image associated with operation of an autonomous vehicle comprising:
    (a) identifying, with a processor, at least one starting pixel associated with the object in the image, the image having a plurality of rows of pixels, the at least one starting pixel located in a first identified row of the plurality of rows;
    (b) identifying, with the processor, at least one adjacent pixel located in an adjacent row to the first identified row, the at least one adjacent pixel being part of the object;
    (c) iterating steps (a)-(b) using the identified at least one adjacent pixel as a starting pixel or starting pixels for a next iteration of steps (a)-(b); and
    (d) forming, with the processor, a line through the identified at least one adjacent pixel located in the adjacent row to the first identified row, to represent the object.

2. The method of claim 1 further comprising forming a line segment between each at least one adjacent pixel identified in each iteration of steps (a)-(b).

3. The method of claim 1 further comprising forming a line by fitting a curve through each at least one adjacent pixel identified in each iteration of steps (a)-(b), in the image.

4. The method of claim 1 wherein the object is a lane object and the image is an image of a road surface.

5. The method of claim 1 wherein identifying the at least one adjacent pixel comprises:
    (b-1) assigning, with the processor, a probability value to each pixel in a plurality of pixels in a window in a row adjacent to the row in which the at least one start pixel is located, wherein the probability value is the likelihood that each pixel in the plurality of pixels is part of the same object as the at least one start pixel; and
    (b-2) identifying, with the processor, that the at least one adjacent pixel is part of the same object as the at least one start pixel when the assigned probability value of the at least one adjacent pixel exceeds a threshold.

6. The method of claim 4 wherein identifying the at least one adjacent pixel comprises:
    (b-1) assigning, with the processor, a probability value to each pixel of a plurality of pixels in a window of a row adjacent to the row the at least one start pixel is located in, wherein the probability value is the likelihood that each pixel of the plurality of pixels is part of the same object as the at least one start pixel; and
    (b-2) identifying, with the processor, the at least one adjacent pixel with the highest probability of being part of the object as being in the same lane as the at least one start pixel.

7. The method of claim 4 wherein identifying the at least one start pixel for the image of a road surface comprises:
    estimating, for each pixel in the image, a probability that each pixel is part of the lane object;
    masking the image pixels to retain pixels located in a border around the edges of the image and discarding pixels in a middle portion of the image;
    thresholding the probabilities of each pixel in the image to classify each pixel in the image into whether or not each pixel in the image is part of the lane object; and
    spatially clustering the pixels into a finite set of initial object pixels from which the initial starting pixel can be selected.

8. The method of claim 1 wherein (d) is performed after the processor identifies an endpoint of the object in a row adjacent to the row in which the previous iteration starting pixel or starting pixels is/are located.

9. The method of claim 4 further comprising estimating, for each pixel in the image, a probability that each pixel is part of the lane object,
    wherein characteristics of a distribution of the probabilities that each pixel is part of the lane object are used to form a measure of uncertainty that the lane object has been detected.

10. The method of claim 9 wherein the degree to which the autonomous vehicle relies on the output of the lane detection system is controlled by a weight having a weight value,
   wherein the weight value is responsive to the measure of uncertainty that a lane object has been detected.

11. The method of claim 9 wherein the autonomous vehicle relies on a plurality of systems to determine its location, one of the systems being the object detection system,
   wherein the location determination relies relatively more on the object detection system when the uncertainty that a lane object has been detected is low and relies relatively less on the object detection system when the uncertainty that a lane object has been detected is high.

12. An autonomous driving system for a vehicle comprising a motion planning subsystem and a lane object detection system,
   wherein the lane object detection system comprises a processor configured to:
   (a) identify at least one starting pixel in an image, the at least one starting pixel associated with a lane object in the image; the image having a plurality of rows of pixels, the at least one starting pixel located in a first row of the plurality of rows;
   (b) identify at least one adjacent pixel in a row adjacent to the first row, wherein the at least one adjacent pixel is part of the lane object;
   (c) iterate steps (a)-(b) using the at least one identified adjacent pixel as a starting pixel or starting pixels for a next iteration of steps (a)-(b); and
   (d) form a line through the at least one adjacent pixel located in the adjacent row to the first identified row, to represent the lane object.

13. The autonomous driving system of claim 12, wherein the processor is configured to identify the at least one adjacent pixel by:
   assigning, with the processor, a probability value to each pixel in a plurality of pixels in a window in a second row, the second row adjacent to the first row, wherein the probability value is the likelihood that each pixel in the plurality of pixels is part of the lane object; and
   identifying, with the processor, the at least one adjacent row pixel as being in the same lane object as the start pixel when the assigned probability value of the at least one adjacent row pixel exceeds a threshold.

14. The autonomous driving system of claim 12 wherein the processor is configured to assign a probability of being part of the lane object to each pixel in a row adjacent to the first row; and
   an adjacent row pixel with the highest probability of being part of the lane object is one of the identified at least one adjacent pixels.

15. The autonomous driving system of claim 12 wherein the identified at least one adjacent row pixel is identified using a trained classifier.

16. The autonomous driving system of claim 12 wherein the processor is configured to connect the at least one identified adjacent row pixel to the start pixel or starting pixels to form a lane object representing the lane, after identifying an endpoint in a row adjacent to the start pixel.

17. The autonomous driving system of claim 12, wherein the image is received from at least one of a camera attached to a moving vehicle, a camera providing an aerial view of a roadway, a satellite imager, and a source of two-dimensional map data.

18. The autonomous driving system of claim 12 further comprising an uncertainty measure for lane objects identified by the lane object detection system, wherein the motion planning subsystem alters parameters associated with safe operation of the autonomous vehicle as a function of the uncertainty measure of the detected lane objects.

19. The autonomous driving system of claim 18 further comprising a subsystem for sensing the presence of objects surrounding the vehicle, wherein the motion planning subsystem increases a first weight applied to a first output of the subsystem for detecting surrounding objects relative to a second weight applied to a second output of the lane object detection system, in order to plan a lateral position of the vehicle, when an uncertainty of a lane object detected by the lane object detection system is above a threshold.

20. The autonomous driving system of claim 18 wherein the motion planning subsystem increases follow distance, decreases speed, or inhibits lane changes of the vehicle, singly or in any combination, when an uncertainty for a lane object detected by the lane object detection system is above a threshold.

* * * * *